US007949328B2

(12) United States Patent
Jiang

(10) Patent No.: US 7,949,328 B2
(45) Date of Patent: May 24, 2011

(54) SYSTEM FOR DELIVERING USER-GENERATED SHORT-TEXT NOTIFIED MULTIMEDIA MESSAGES BETWEEN OPERATOR NETWORKS

(75) Inventor: John Yue Jun Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 66 days.

(21) Appl. No.: 11/520,799

(22) Filed: Sep. 14, 2006

(65) Prior Publication Data
US 2007/0055995 A1    Mar. 8, 2007

Related U.S. Application Data

(63) Continuation-in-part of application No. 11/374,427, filed on Mar. 14, 2006.

(60) Provisional application No. 60/717,109, filed on Sep. 14, 2005, provisional application No. 60/662,031, filed on Mar. 14, 2005, provisional application No. 60/662,030, filed on Mar. 14, 2005, provisional application No. 60/662,028, filed on Mar. 15, 2005, provisional application No. 60/670,917, filed on Apr. 13, 2005.

(51) Int. Cl.
*H04M 1/725* (2006.01)

(52) U.S. Cl. .................. 455/412.1; 455/412.2; 455/413; 455/414.1; 455/415; 455/466; 379/1.02; 379/67.1; 379/265.09

(58) Field of Classification Search .... 455/412.1–412.2, 455/413, 414.1, 415, 466; 379/1.02, 67.1, 379/265.09
See application file for complete search history.

(56) References Cited

U.S. PATENT DOCUMENTS

| 6,032,039 | A  | * | 2/2000 | Kaplan | 455/413 |
| 2001/0025301 | A1 | * | 9/2001 | Anderson | 709/207 |
| 2002/0154747 | A1 | * | 10/2002 | Shtivelman | 379/88.19 |
| 2003/0193951 | A1 | * | 10/2003 | Fenton et al. | 370/392 |

(Continued)

FOREIGN PATENT DOCUMENTS

| EP | 1453328 A1 | 9/2004 |
| EP | 1622412 A1 | 2/2006 |
| WO | WO 2004/100597 A1 | 11/2004 |

OTHER PUBLICATIONS

3rd Generation Partnership Project; Technical Specification Group Core Network and Terminals; Multimedia Messaging Service (MMS); Functional description; Stage 2 (Release 6) 3GPP TS 23.140 V6.10.0 (Jun. 2005), Jun. 1, 2005, pp. 1-214, XP002473514.

*Primary Examiner* — Wayne Cai
(74) *Attorney, Agent, or Firm* — Arent Fox LLP

(57) ABSTRACT

A system for delivering a multimedia message from a message sender in a sender voice/video short messaging service system (VVSS) operator network to a message recipient in a recipient operator network. The system comprises a services hub suitable for routing the multimedia message, the services hub comprising one or more of a first interface with a sender in the sender VVSS operator network, a second interface with a second VVSS in the recipient operator network, a third interface with a third-party VVSS in a third-party VVSS operator network, wherein the third-party operator network is in communication with the recipient operator network, and a fourth interface with another services hub. Further, the services hub communicates with a sender VVSS and a recipient operator. The recipient operator may be a recipient VVSS operator or a non-VVSS recipient operator.

34 Claims, 13 Drawing Sheets

U.S. PATENT DOCUMENTS

2004/0203766 A1* 10/2004 Jenniges et al. ............ 455/435.1
2004/0235456 A1* 11/2004 Liao et al. .................. 455/412.1
2005/0111632 A1*  5/2005 Caputo et al. .............. 379/88.16
2006/0035632 A1*  2/2006 Sorvari et al. ................. 455/418
2006/0056419 A1*  3/2006 Eichler et al. ............ 370/395.52
2006/0179112 A1*  8/2006 Weyer et al. .................. 709/206

* cited by examiner

SYSTEM FOR DELIVERING USER-GENERATED SHORT-TEXT NOTIFIED MULTIMEDIA MESSAGES BETWEEN OPERATOR NETWORKS

CROSS-REFERENCE TO RELATED APPLICATION

This application claims priority from U.S. Provisional Patent Application Ser. No. 60/717,109 entitled "Voice SMS and Video SMS", filed Sep. 14, 2005. This Application is also a Continuation-in-Part of U.S. application Ser. No. 11/374,427 filed Mar. 14, 2006, which claims priority from Provisional Application No. 60/662,031 filed Mar. 14, 2005. This application also claims priority from the following Applications: U.S. application Ser. No. 11/374,437 filed Mar. 14, 2006, which claims priority from Provisional Application No. 60/662,030 filed Mar. 14, 2005; U.S. application Ser. No. 11/375,577 filed Mar. 15, 2006, which claims priority from Provisional Application No. 60/662,028 filed Mar. 15, 2005; U.S. application Ser. No. 11/402,128 filed Apr. 12, 2006, which claims priority from, Provisional application No. 60/670,917 filed Apr. 13, 2005; and U.S. application Ser. No. 10/635,804 filed Aug. 5, 2003, now U.S. Pat. No. 7,072,651, which claims priority from Provisional Application No. 60/401,362 filed Aug. 5, 2002. All of these applications are incorporated by reference herein in their entirety.

BACKGROUND OF THE INVENTION

Field of the Invention

The present disclosure relates generally to transmission of information over an electronic network, and more specifically, to a multimedia messaging service.

The use of multimedia messaging service (MMS) technology is gaining popularity. The MMS technology facilitates delivery of multimedia messages—messages that include audio, video or image. A mobile operator providing MMS services to a subscriber should have an MMS-compatible infrastructure in place. A sender, wishing to send a multimedia message intended for a recipient, sends the multimedia message to a multimedia message service center (MMSC) of the sender's mobile operator. The multimedia message may include a recipient address. The MMSC of the sender's mobile operator delivers the multimedia message to the MMSC of the recipient's mobile operator either directly or via a MMS hub or MMS gateway. The MMSC of the recipient's MMS operator sends the multimedia message to the recipient. The recipient then views the multimedia message on a MMS-compatible handset.

Thus, operators who send and receive a multimedia message need to host a MMSC. The sender's mobile operator cannot deliver the multimedia message to the recipient unless the sender's mobile operator or the recipient's mobile operator hosts MMSC. Also, MMS coverage provided by mobile operators supporting the MMS technology is often limited to a region.

Thus, there is a need for a solution that facilitates seamless interworking between mobile operators and enables the delivery of multimedia messages irrespective of whether the recipient mobile operator hosts an MMSC.

SUMMARY

The present invention meets these and other needs by providing methods and systems for delivering multimedia messages from message senders in sender voice/video short messaging service system (VVSS) operator networks to message recipients in recipient operator networks. In embodiments of the present invention, the method and system include a services hub suitable for routing the multimedia message, the services hub comprising one or more of: a first interface with a sender in the sender VVSS operator network, a second interface with a second VVSS in the recipient operator network, a third interface with a third-party VVSS in a third-party VVSS operator network, wherein the third-party operator network is in communication with the recipient operator network, and a fourth interface with another services hub. Further, in some embodiments, the services hub communicates with a sender VVSS and a recipient operator, and the recipient operator may be a recipient VVSS operator or a non-VVSS recipient operator.

In one embodiment, the present invention provides a multimedia message interworking method and system for delivering a multimedia message to at least one message recipient. The method and system comprises a sender VVSS in communication with a message recipient. Further, the sender VVSS comprises a first multimedia message storage to store the multimedia message and a sender routing table to store routing information of at least one recipient operator. The sender VVSS comprises a sender routing logic that determines a mode of interworking for routing the multimedia message to at least one message recipient based upon the routing information.

Additional advantages and novel features of the invention will be set forth in part in the description that follows, and in part will become more apparent to those skilled in the art upon examination of the following or upon learning by practice of the invention.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

In the context of some embodiments of the present invention, a "VVSS" means a voice and/or video short messaging service system; a "VVSS message" is a multimedia message that is routed through a VVSS hosted by an operator; a "non-VVSS message" is a multimedia message that may not be routed via the VVSS hosted by an operator; a "message sender" is a sender of the VVSS message; a "message recipient" is a recipient of the VVSS message; a "sender VVSS operator" is the sender operator that hosts a VVSS; a "sender VVSS operator network" is the network of the sender VVSS operator; a "sender VVSS" is the VVSS hosted at the sender VVSS operator; a "recipient VVSS operator" is the recipient operator that hosts a VVSS; a "recipient VVSS operator network" is the network of the recipient VVSS operator; a "recipient VVSS" is the VVSS hosted at the recipient VVSS operator; a "non-VVSS recipient operator" is the recipient operator that does not host a VVSS; and a "recipient operator network" includes a "VVSS recipient operator network" and a "non-VVSS recipient operator network". Though the aforesaid definitions are used to exemplify one or more embodiments of the present invention, these definitions should not be used to restrict the meaning of the terms in any sense.

Figure 1:
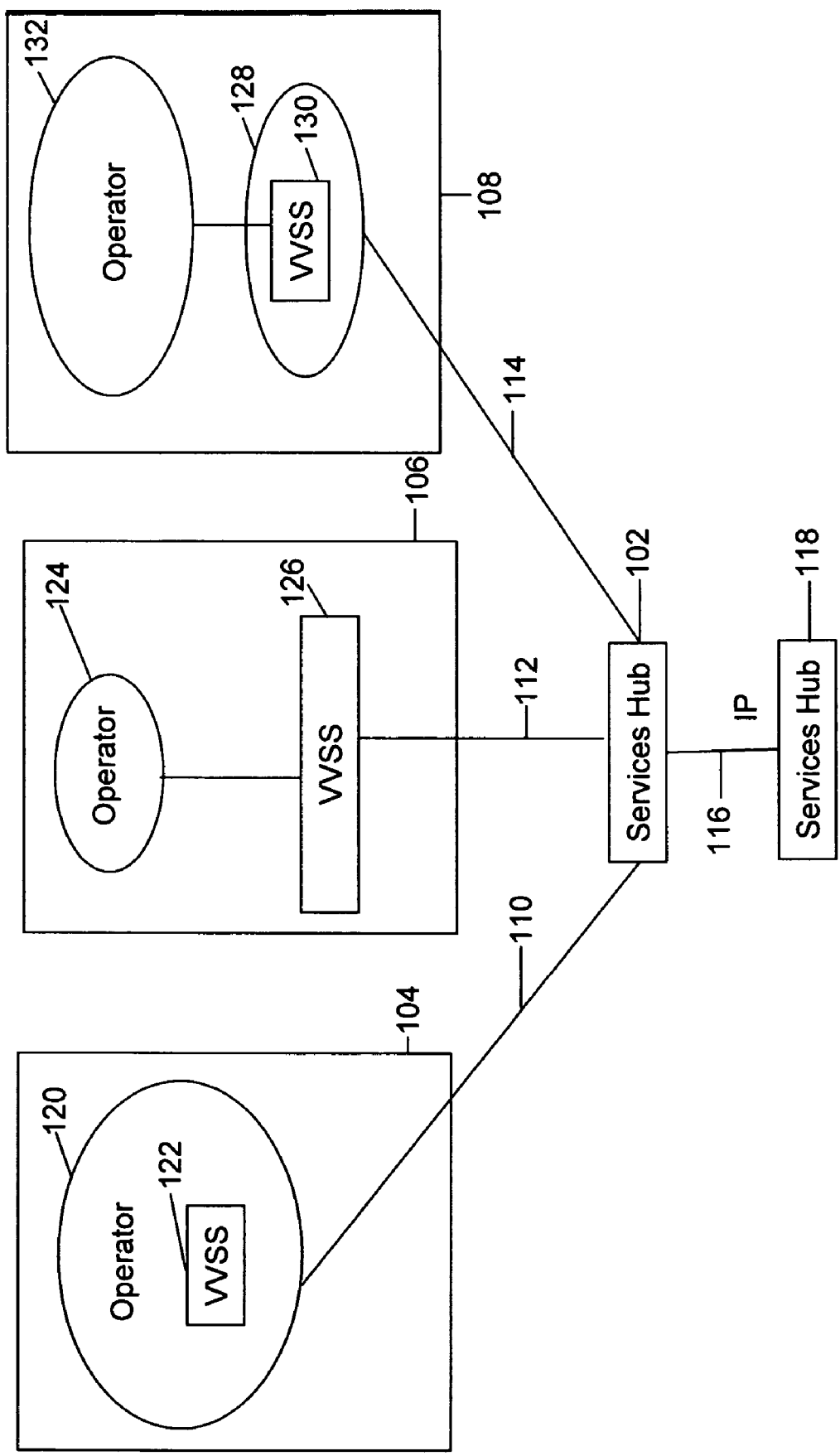
FIG. 1 illustrates an ecosystem for providing seamless inter-working between at least two operators, in accordance with an embodiment of the present invention.

FIG. 1 illustrates an ecosystem for providing seamless inter-working among at least two operators, in accordance with an embodiment of the present invention. The operators may be located in the same or different regions, such as in different countries. The ecosystem comprises at least one services hub 102, a first voice/video short messaging service system (VVSS) deployment architecture 104, a second VVSS deployment architecture 106, and a third VVSS deployment architecture 108. The services hub 102 comprises, without limitation, at least one of a first interface 110, a second interface 112, a third interface 114, and a fourth interface 116. The services hub 102 may route multimedia messages to a recipient operator, which may or may not be located in the region, such as the country of the sender operator. Also, the services hub 102 may handle number portability check and alternative route selection in the event the recipient is a subscriber of a non-VVSS recipient operator.

In various embodiments, an operator, namely, a sender operator or a recipient operator, may deploy a VVSS based upon the operator's size and location. Further, in one embodiment, the services hub 102 may be integrated with a sender VVSS operator. For example, when the ecosystem is assembled, each VVSS may have an integrated services hub that handles routing of the multimedia messages without intermediate or centrally hosted hub(s).

In another embodiment, the services hub 102 may be coupled to another services hub 118 via the fourth interface 116. The fourth interface 116 may be an Internet protocol (IP) interface, for example. This architecture may be deployed when there are regional hubs of service. The services hubs 102 and 118 provide scalability to operators, namely, a sender operator or a recipient operator, for delivering multimedia messages to message recipients.

Further, the services hub 102 may be coupled to the first VVSS deployment architecture 104 via the first interface 110. The first interface 110 may be an IP interface, for example. The first VVSS deployment architecture 104 comprises a first operator network 120 hosting a first VVSS 122. The first operator network may be a first sender VVSS operator network or a first recipient VVSS operator network.

The services hub 102 may be coupled to the second VVSS deployment architecture 106 via the second interface 112, for example, and the second interface 112 may be an IP interface. In one embodiment, the second VVSS deployment architecture 106 comprises a second operator 124 coupled to a second VVSS 126. The second operator 124 may be coupled to the second VVSS 126 using, for example, IP interface, time division multiplexing (TDM), or signaling system #7 (SS7) protocol. The second VVSS 126 may be coupled to a short messaging service center (SMSC), a MMSC or a mobile switching center (MSC) of the second operator 124 via an IP interface, such as Internet protocol multimedia subsystems/session initiation protocol (IMS/SIP) and the like. The SS7 interface to the second operator 124 includes, but is not limited to, an integrated services digital network user part (ISUP), customized applications for mobile networks enhanced logic application part/intelligent network (CAP/IN), and the like. The second operator may be a second sender VVSS operator or a second recipient VVSS operator.

In one embodiment, the services hub 102 may be coupled to the third VVSS deployment architecture 108 via the third interface 114. The third interface 114 may be an IP interface. The third VVSS deployment architecture 108 comprises a third operator 128 hosting a third VVSS 130. Further, the third operator 128 communicates with another operator 132 (which may, for example, be the same operator as the second operator 124) via a circuit-switched connection, a packet-switched connection or a message switched connection. In one embodiment, the second operator and the third operator may be located in the same region, such as the same country. Further, the second operator may communicate with the services hub 102 via the third operator.

The operators may be connected to the services hub using an international voice over Internet protocol (VoIP) carrier or a media gateway, for example. In case the international VoIP carrier is used, the VoIP carrier translates IP back to ISUP to interface with VVSS. In case the media gateway is used, each connecting operator may configure their switches to route * prefixed calls to the VoIP/media gateway. In the backend, the VoIP/media gateway may be connected to the host media processing applications via IP (e.g., SIP/IMS).

Further, any operator hosting a VVSS may be coupled to a media gateway. The media gateway may be coupled to a VVSS (122, 126 or 130) on one side and the services hub 102 on the other side. The media gateway may be coupled to the VVSS via a circuit-switched connection, a packet-switched connection (e.g., IP, SIP, IMS) or a message switched connection, for example. In one embodiment, if an operator provides a media gateway 132, a TDM interface may not be required between the operator and its VVSS.

The message sender and the message recipient may be subscribers of one of the operators 120, 124 and 128, and the services hub 102 may provide for routing of a multimedia message from the message sender to the message recipient. Further, the services hubs 102 and 118 may provide interworking transport, such as MMS, general packet radio service roaming exchange (GRX), or short messaging service (SMS) aggregators, across regions (e.g., countries). In some embodiments, any operator that is connected to services hub 102 or 118 can interwork with the other operators connected to the ecosystem. In one embodiment, in the beginning, the ecosystem may have the services hub integrated with a VVSS, so that direct routing of multimedia messages between two VVSS may take place. However, the ecosystem may take a form in which some VVSS share the services hub for the routing and relaying of multimedia messages. Thus, the ecosystem of FIG. 1 will gradually build up over time, and the ecosystem's coverage may build up, as operators sign into the ecosystem. The ecosystem may also allow the connection of competing VVSS, whether these competing VVSS are point-solution based or located in another ecosystem, such as SMS interworking/aggregators, MMS, and GRX hubbing and peering.

In one embodiment, a VVSS hosted by the operators may be owned and hosted by the operators. In another embodiment, the operators may opt to connect to the VVSS owned by a third party.

Figure 2:
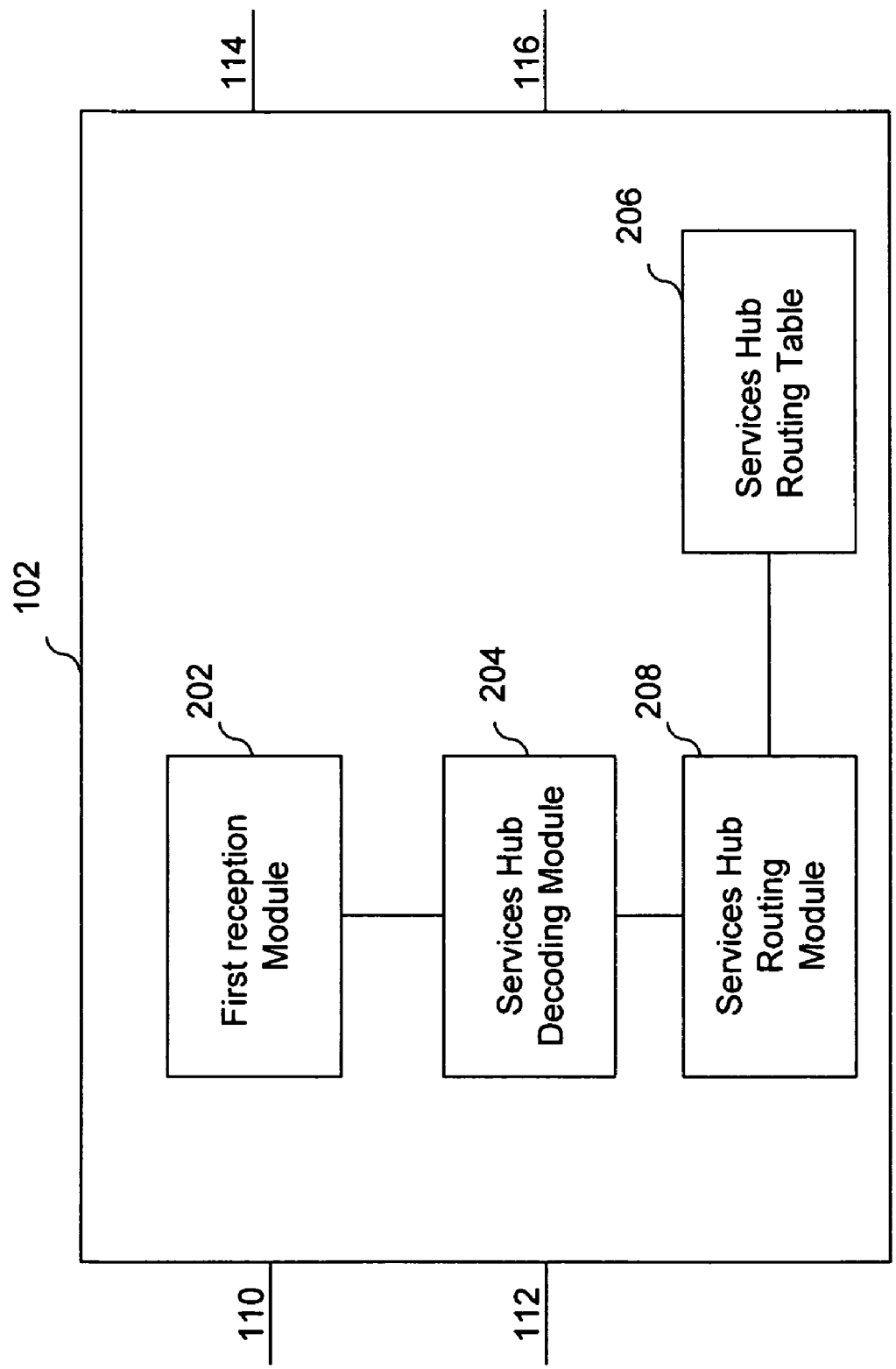
FIG. 2 illustrates a detailed block diagram of services hub, in accordance with an embodiment of the present invention.

FIG. 2 illustrates a detailed block diagram of services hub 102 in accordance with an embodiment of the present invention. Note that services hub 118 may have a similar structure to that of services hub 102. The services hub 102 comprises a first reception module 202, a services hub decoding module 204, a services hub routing table 206, and a services hub routing module 208. The reception module 202 receives a multimedia message sent by one of the VVSS 122, 126 or 130 of FIG. 1. The services hub decoding module 204 decodes the recipient operator network identification, such as the country code (CC) and network destination code (NDC) present in the received multimedia message. The recipient operator network identification may be incorporated in the header of the multimedia message. Alternatively, the services hub decoding module 204 decodes the recipient operator network identification, such as the CC and NDC, present in a query received from the sender VVSS.

The services hub routing module 208 then uses the services hub routing table 206 to identify the next routing hop using at least one of the recipient number and message type. The next routing hop is selected from a group consisting of a third-party VVSS operator, the services hub, and a recipient VVSS operator. In one embodiment, the services hub routing table 206 contains a table mapping mobile country codes (MCCs)/mobile network codes (MNCs) to VVSS-addresses. The recipient operator network identification includes at least one of an international mobile subscriber identity (IMSD) or an IP address of the recipient operator network.

An exemplary illustration of a routing table of mapping between CC/NDC to MCC/MNC may be as follows:

```
CC/NDC => MCC/MNC
86 139 => 460 01
86 138 => 460 01
852 90 => 454 00
```

Note that different CC/NDC can map to the same MCC/MNC.

An exemplary illustration of a routing table of MCC/MNC to VVSS addresses may be as follows:

```
MCC/MNC
Or CC/NDC    =>  VVSS-address-operator/hub
460 01 => VVSS-address-China-Mobile
454 00 => VVSS-address-HK-CSL
515 03 => VVSS-address-Philippines-Smart
86 106 => VVSS-address-China-Beijing
*      => VVSS-address-of-hub
```

In one embodiment, the MCC/MNC entry may contain CC/NDC, and the services hub 102 may issue a mobile application part send routing information for short message (MAP SRI-SM) (recipient-number) to the recipient operator. If the MAP-SRI-SM returns an IMSI, the services hub decoding module 204 is able to deduce the MCC and the MNC from the IMSI. However, if the MAP-SRI-SM results in no response, the original CC/NDC of the recipient number may be treated as its MCC/MNC. In one embodiment, if the services hub 102 ignores a number portability check, then its services hub routing table 206 may contain CC/NDC entries and a "*" wild card entry to another hub address. The wild card "*" may, for example, mean to match all if the previous entries in the table are not matched.

In various embodiments, the services hub 102 may include several routing tables, with each routing table defined according to the type of the multimedia message. The type can be determined via an extensional or new message header, such as "Message-Type". For example, "Message-Type: MMS" could be used to indicate that the multimedia message is in the format of an MMS. Another example, "Message-Type: VVSS" could be used to indicate that the multimedia message is in the format of Voice/Video SMS. Alternatively, the type can be determined by the multi-purpose Internet mail extensions (MIME) type of the multimedia message, such as application/x-MMS or application/x-VVSS. The services hub 102 may apply the routing table corresponding to the type of the multimedia message to route the multimedia message to the correct recipient operator. For the context of this application, the services hub may deal with multimedia messages of the type "VVSS."

In one embodiment, the services hub routing module 208 deciphers whether the recipient operator to which the multimedia message is to be sent is linked to the services hub 102 using the services hub routing table 206. Thereafter, the services hub routing module 208 routes the multimedia message using one of the second interface, the third interface, or the fourth interface. In one embodiment, an operator may be considered linked to the services hub 102 in cases in which the operator is not physically connected to the ecosystem, but the operator communicates with a third-party VVSS operator present in its region, such as its country. Further, the services hub 102 may determine, such as from its routing table or after interacting with another hub, that the multimedia message cannot be routed. The services hub informs such a result to the sender VVSS, which, in turn, may store the multimedia message in its multimedia message storage. The sender VVSS may send out a notification alert, which may contain a retrieval number, to the recipient number.

Figure 3:
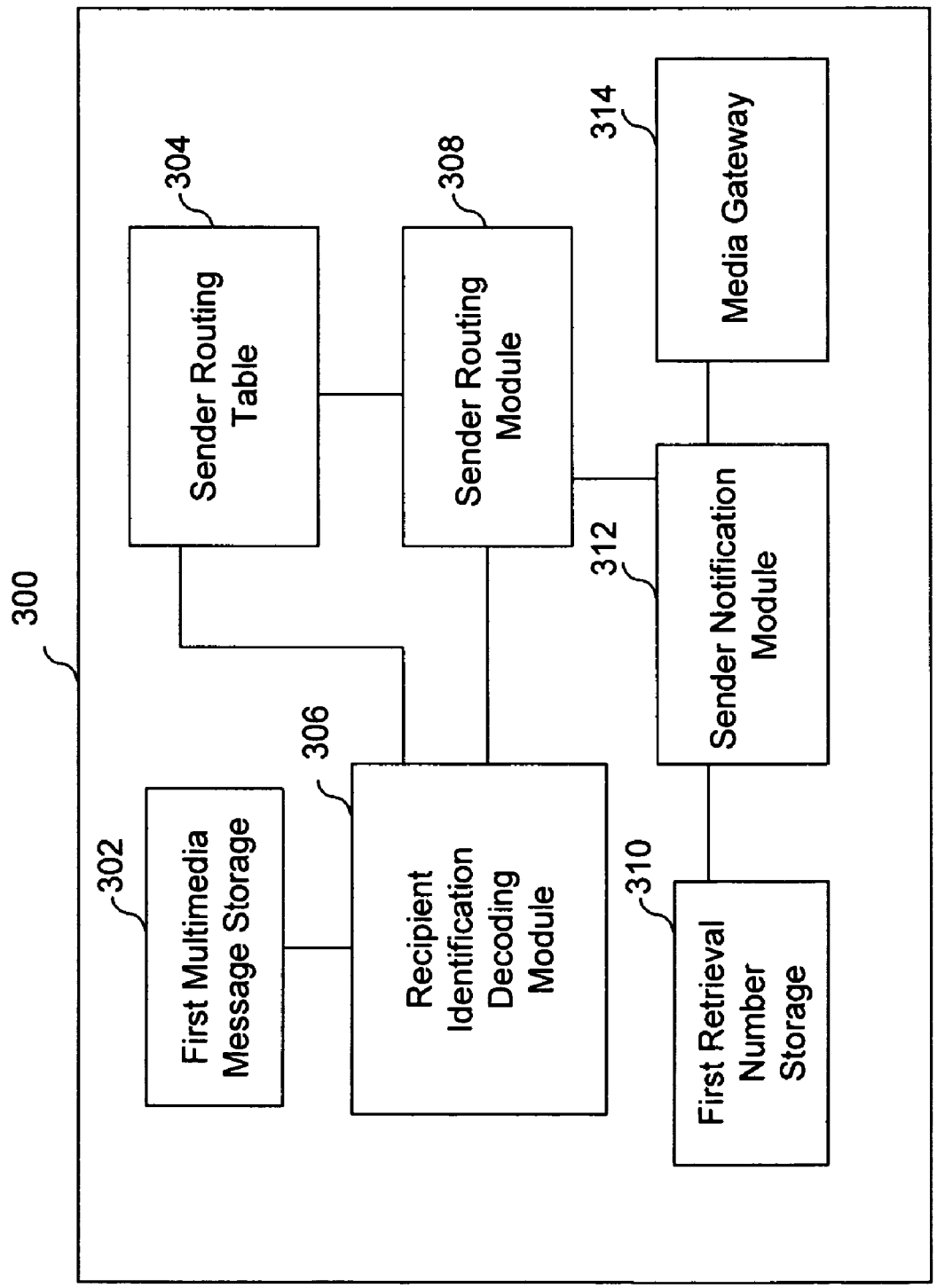
FIG. 3 illustrates a detailed block diagram of a sender VVSS, in accordance with an embodiment of the present invention.

FIG. 3 illustrates a detailed block diagram of a sender VVSS 300, in accordance with an embodiment of the present invention. The sender VVSS comprises a first multimedia message storage 302, a sender routing table 304, a recipient identification decoding module 306, and a sender routing module 308. Optionally, the sender VVSS 300 also comprises a first retrieval number storage 310, a sender notification module 312, and a media gateway 314. The first multimedia message storage 302 stores a multimedia message sent by a message sender, while the sender routing table 304 stores the routing information of at least one recipient operator.

The recipient identification decoding module 306 decodes the recipient operator network identification upon receipt of the message recipient number, so as to obtain the CC and NDC of the recipient number to which the multimedia message is to be sent. In one embodiment, the sender VVSS 300 may issue a MAP SRI-SM (recipient-number) to the recipient operator. If the MAP-SRI-SM returns IMSI, the recipient identification decoding module 306 may deduce the MCC and the MNC from the IMSI. However, if the MAP-SRI-SM results in no response, the original CC/NDC of the recipient number may be treated as its MCC/MNC. The recipient identification decoding module 306 then uses the sender routing table 304, containing a table of mapping of MCC/MNC to VVSS-address, to obtain the recipient VVSS address or hub address. The sender routing module 308 then uses the sender routing table 304 to identify the next routing hop using at least one of the recipient number and message type. The next routing hop is selected from a group consisting of a third-party VVSS operator, the services hub, and a recipient VVSS operator.

An exemplary illustration of a table of mapping between CC/NDC to MCC/MNC may be as follows:

| CC/NDC => MCC/MNC |
|---|
| 86 139 => 460 01 |
| 86 138 => 460 01 |
| 852 90 => 454 00 |

Note that different CC/NDC can map to the same MCC/MNC

An exemplary illustration of a table of MCC/MNC to VVSS addresses may be as follows:

| MCC/MNC Or CC/NDC => VVSS-address-operator/hub |
|---|
| 460 01 => VVSS-address-China-Mobile |
| 454 00 => VVSS-address-HK-CSL |
| 515 03 => VVSS-address-Philippines-Smart |
| 86 106 => VVSS-address-China-Beijing |
| * => VVSS-address-of-hub |

In one embodiment, the MCC/MNC entry may contain CC/NDC. The wild card "*" may mean "match all" if the previous entries in the table are not matched.

In one embodiment, if the sender VVSS does not apply the number portability check, then the routing table might contain CC/NDC entries and "*" wild card entry to the services hub address.

Once the recipient operator is determined, the sender routing module 308 selects a mode of interworking for routing the multimedia message to at least one message recipient based upon the routing information. The mode of interworking comprises a bilateral communication or indirect interworking. The bilateral communication can involve a sender VVSS in a region communicating with a recipient VVSS in the same region, such as the same country. Alternatively, the bilateral communication can involve a sender VVSS in a region communicating with a recipient VVSS in a different region, such as a different country. Alternatively, the bilateral communication can involve a sender VVSS in a region communicating with a non-VVSS recipient in the same region, such as the same country.

In some embodiments, the sender routing module 308 facilitates bilateral communication using one of a services hub, a general packet radio service roaming exchange (GRX), a multimedia messaging service (MMS) broker, or a point of presence (POP). Alternatively, the sender routing module 208 may facilitate the bilateral communication using one of a MM4 protocol or a SS7 protocol. Alternatively, the sender routing module 308 may facilitate the bilateral communication using one of a packet switched network, a circuit-switched network or a message switched network.

If the sender routing module 308 determines that the recipient operator is a non-VVSS operator in a different region, such as a different country, the module 308 facilitates indirect interworking, which comprises communication between the sender VVSS and the non-VVSS recipient operator via a third-party VVSS operator, if the third-party VVSS operator is present. The third-party VVSS operator will be in the same region, such as the same country, as the non-VVSS recipient operator. However, in such cases, the sender VVSS is in bilateral communication with the third VVSS operator, and the non-VVSS recipient operator is in bilateral communication with the third VVSS operator.

In one embodiment, if the sender routing module 308 of the sender VVSS 300 determines that the recipient is a subscriber of the sender VVSS 300, the module 308 handles the multimedia message delivery itself. In one embodiment, the sender notification module 312 generates a notification alert to be sent to the message recipient. The notification alert comprises at least one of a multimedia message type, a message sender's identification, and one of the multimedia message retrieval numbers. The multimedia message retrieval number for a recipient can include a prefixed sender number of the multimedia message if the message recipient is a subscriber of the sender VVSS 300. The multimedia message type comprises a VVSS message type or a non-VVSS message type, for example.

However, if the sender routing module 308 of the sender VVSS 300 deciphers that the message recipient is not its subscriber, it may query the services hub 102 (FIG. 1) to check whether a corresponding recipient operator is a member of the ecosystem. If the recipient operator is a member of the ecosystem, the sender VVSS sends the multimedia message to the services hub 102 (FIG. 1) after stripping off the prefix of the message recipient number, which is able then to relay the multimedia message to the recipient VVSS through the hub infrastructure. In case the recipient operator is a non-VVSS recipient operator, the sender VVSS 300 may send a multimedia message retrieval number that identifies the multimedia message stored in the sender VVSS for the non-VVSS message recipient.

The first retrieval number storage 310 stores a set of multimedia message retrieval numbers. In one embodiment, the multimedia message retrieval numbers, together with the recipient number identify recipient multimedia messages that are stored in the sender VVSS, when the message recipients are not subscribers of a VVSS. The recipients are able to call the numbers to directly retrieve multimedia messages left for them. The multimedia message retrieval number comprises one of a local number of the sender VVSS, a VoIP number of the sender VVSS, or a local number of the recipient country mapped to an international number of a sender VVSS.

In one embodiment, the multimedia message retrieval numbers include a global set of numbers for all message recipients, and the multimedia message retrieval numbers are defined per message recipient number, so that the same set of multimedia message retrieval numbers are able to be used by different message recipients. In the case of a global set, the set can be large. In the case of the same set for each message recipient number, the set can be relatively small, since the same number can be used to denote multimedia messages from different message recipients. For example, if N1, N2, N3, ... N100 are the same set of message retrieval numbers for each message recipient, a message retrieval number, for example, N23, may be used to represent a multimedia message M1 for message recipient R1, and a multimedia message M2 for message recipient R2. When message recipient R1 calls the message retrieval number N23, based on the caller ID R1, the recipient VVSS retrieves the multimedia message M1 for message recipient R1. When message recipient R2 calls the same message retrieval number N23, based on the caller ID R2, the recipient VVSS retrieves the multimedia message M2 for message recipient R2.

Further, in some embodiments, the sender VVSS 300 is preferably coupled with the media gateway 314 via one of a circuit-switched connection, a packet-switched connection, or a message switched connection.

Though the services hub 102 (FIG. 1) and the sender VVSS 300 are described as separate components of the ecosystem, the services hub and the sender VVSS can be integrated together, with such an implementation also falling within the scope and spirit of the present invention.

Figure 4:
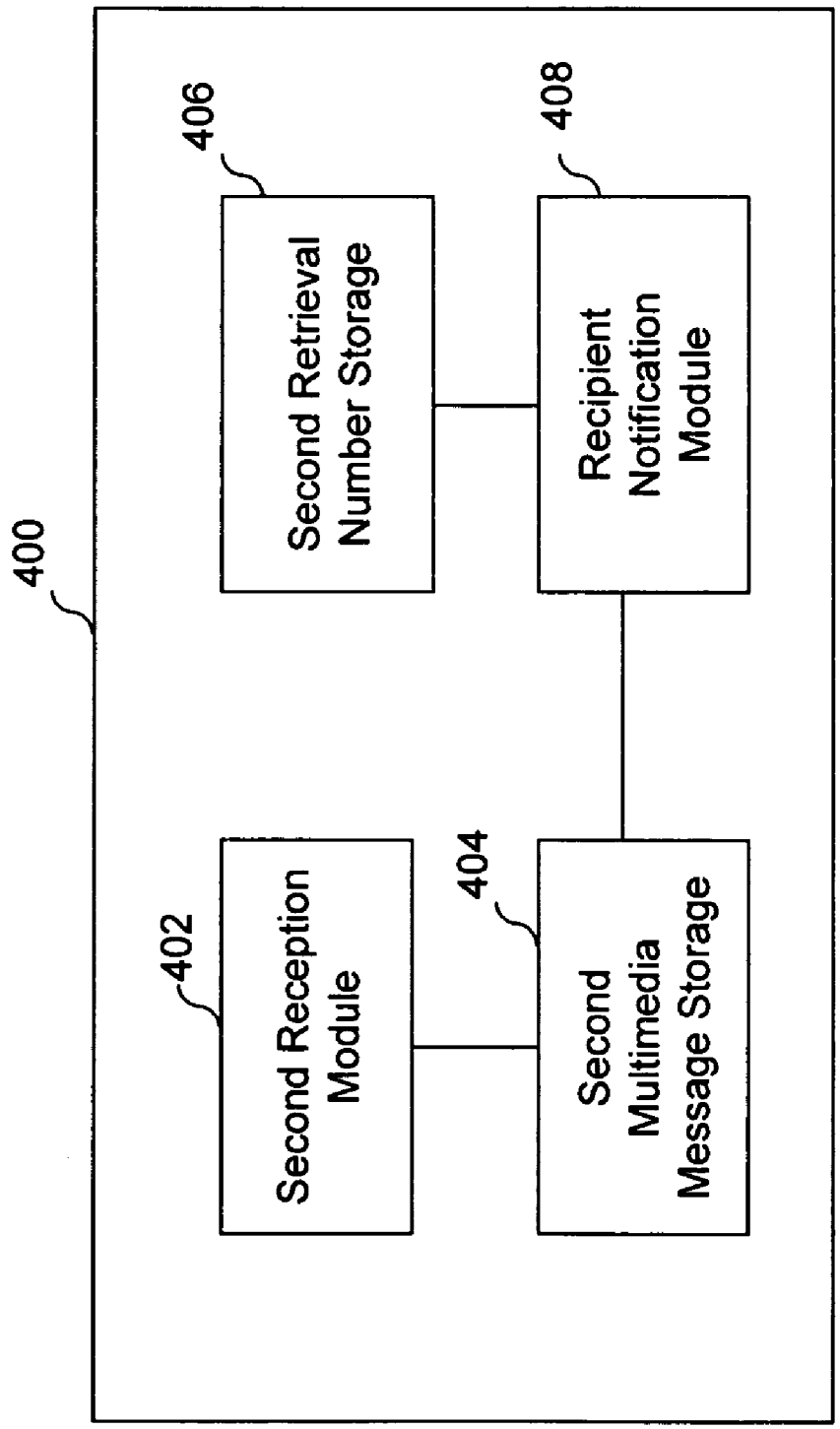
FIG. 4 illustrates a recipient VVSS, in accordance with an embodiment of the present invention.

FIG. 4 illustrates a recipient VVSS 400 in accordance with an embodiment of the present invention. The recipient VVSS comprises a second reception module 402, a second multimedia message storage 404, a second retrieval number storage 406 and a recipient notification module 408. The second reception module 402 receives a multimedia message either from the services hub 102 (FIG. 1) or the sender VVSS 300 (FIG. 3), for example, and stores the multimedia message in the second multimedia message storage 404. The second retrieval number storage 406 stores a set of multimedia message retrieval numbers. The numbers are intended, for example, to identify multimedia messages that are stored in the recipient VVSS 400 for subscribers of a non-VVSS recipient operator. The non-VVSS recipient operator subscribers can call these retrieval numbers to directly retrieve the multimedia messages left for them. The multimedia message retrieval number comprises one of a local number of the recipient VVSS 400, a VoIP number of the recipient VVSS 400, or a local number of the country of the non-VVSS operator subscriber mapped to an international number of the recipient VVSS 400.

Further, the multimedia message retrieval numbers can be a global set of numbers for all message recipients, or they can be defined per message recipient number, so that the same set of multimedia message retrieval numbers can be used by different message recipient numbers. In the case of a global set, the set may be large. In the case of the same set for each message recipient number, the set may be small, since the same number can be used to denote different recipients' multimedia messages. For example, if N1, N2, N3, ... N100 are the set of multimedia message retrieval numbers for each message recipient, then a multimedia message retrieval number N23 can be used to represent a multimedia message M1 for message recipient R1, and a multimedia message M2 for message recipient R2. When message recipient R1 calls the message retrieval number N23, based on the caller ID R1, the recipient VVSS retrieves the multimedia message M1 for message recipient R1, and when message recipient R2 calls the same message retrieval number N23, based on the caller ID R2, the recipient VVSS 400 retrieves the multimedia message M2 for message recipient R2.

In some embodiments, the recipient notification module 408 generates a notification alert. The notification alert includes at least one of a multimedia message type, a message sender's identification, and one of the multimedia message retrieval numbers. The retrieval number of a multimedia message for a message recipient can include a prefixed sender number of the multimedia message if the recipient is a subscriber of the recipient VVSS operator. Otherwise, the retrieval number may identify the multimedia message stored in the recipient VVSS 400 for the non-VVSS recipient. In one embodiment, the recipient notification module 408 may generate the notification alert to be sent to a message recipient by using its own prefix (e.g. "00" instead of "**"), prefixed to the message sender's number. The recipient notification module 408 then sends the notification alert to the message recipient.

In one embodiment, the recipient notification module 408 may generate the notification alert with a recipient operator configured sponsor prefix to the message sender number. The recipient operator's configured prefix indicates that the message sender of the multimedia message will sponsor/pay for the message recipient's multimedia message retrieval and response. The recipient operator's configured prefix can be the same prefix as the sponsor prefix used by the sender VVSS 300 (FIG. 3), for example. When the message recipient receives the notification alert from the recipient VVSS 400, the message recipient may dial the specially prefixed sender number to retrieve and respond to the multimedia message. The recipient operator will not bill the message recipient for the calls or response due to the special prefix associated with the called number. Instead, the recipient operator will bill the sender operator by passing the sender number and the recipient number. The sender operator can then bill the message sender for the recipient's retrieval and response.

Alternatively, to indicate that the message sender of the multimedia message will sponsor/pay for the message recipient's multimedia message retrieval and response, a new MM4 extensional header, such as Sponsored-by-Sender, may be defined in the multimedia message. It may be noted that the special prefix or the new MM4 extensional header for a sender sponsored message may need to be agreed between the members of an ecosystem and may therefore be applicable to the recipient operators that have a VVSS.

Figure 5A:
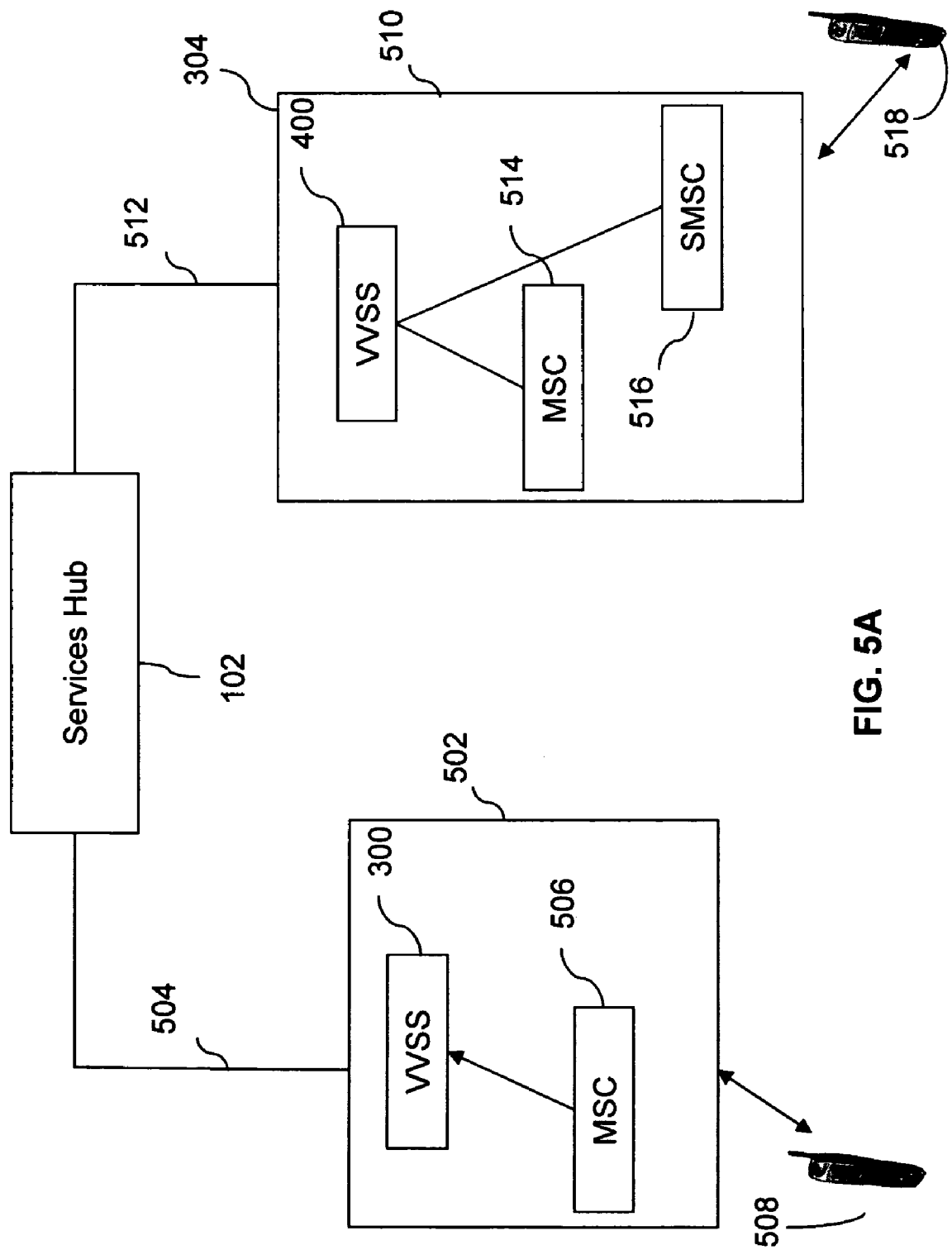
FIG. 5A depicts an embodiment of the present invention addressing interworking between the sender VVSS and the recipient VVSS via services hub.

FIG. 5A depicts an embodiment of the present invention dealing with interworking between the sender VVSS 300 and the recipient VVSS 400 via services hub 102. In an embodiment, the sender VVSS operator 502 and the recipient VVSS operator 510 may be located in different regions, such as different countries. The sender VVSS operator 502 hosts the sender VVSS 300 that communicates with the service hub 102 over a first link 504, via, for example, a MM4 protocol and a MSC 506.

In one embodiment of the present invention, the sender VVSS 400 communicates with MSC 506 using one of IP, SS7 protocol, or voice trunk. Further, the sender VVSS operator 502 services a message sender 508. A recipient VVSS operator 510 hosts the recipient VVSS 400, which communicates with the service hub 102 over a second link 512, via, for example, a MM4 protocol. The recipient VVSS operator 510 comprises a MSC 514 and an SMSC 516. In an embodiment of the present invention, the recipient VVSS 400 communicates with the MSC 514 using one of IP, SS7 protocol, or voice trunk. In one embodiment, the recipient VVSS 400 communicates with the SMSC 516 using one of IP, SS7 protocol, or voice trunk. The recipient VVSS operator 510 services a message recipient 518.

In an embodiment of the present invention, the message sender 508 calls the sender VVSS operator 502 to send a multimedia message intended for the message recipient 518. The MSC 506 establishes a connection between the message sender 508 and the sender VVSS 300. The message sender 508 leaves the multimedia message at the sender VVSS 300. The multimedia message may be a voice message or a video message, for example. The sender VVSS 300 identifies the recipient VVSS operator 510 using the message recipient number as described in conjunction with FIG. 3, for example. The sender VVSS 300 may embed at least one type of the multimedia message and the identification details of the recipient VVSS operator 510 in the multimedia message. The sender VVSS 300 may send the multimedia message to the services hub 102 over the first link 504. The services hub 102 identifies the recipient VVSS operator 510 using the recipient identification provided in the multimedia message as described in conjunction with FIG. 2. Thereafter, the services hub 102 routes the multimedia message to the recipient VVSS operator 510 using the second link 512. The recipient VVSS 400 stores the multimedia message and directs the SMSC 516 to send a notification alert to the message recipient 518, and the SMSC 516 then sends the notification alert to the message recipient 518. The notification alert may be received by a number of the recipient VVSS. The message recipient 518 may call-back on the number provided in the notification alert to retrieve the multimedia message. directs the SMSC 516 to send a notification alert to the non-VVSS recipient operator 520. The SMSC 516 sends the notification alert to the SMSC 524. The notification alert may comprise a number of the third-party VVSS 512, for example. The SMSC 524 relays the notification alert to the message recipient 528. The message recipient 528 may call back at the number provided in the notification alert to retrieve the multimedia message.

Figure 6A:
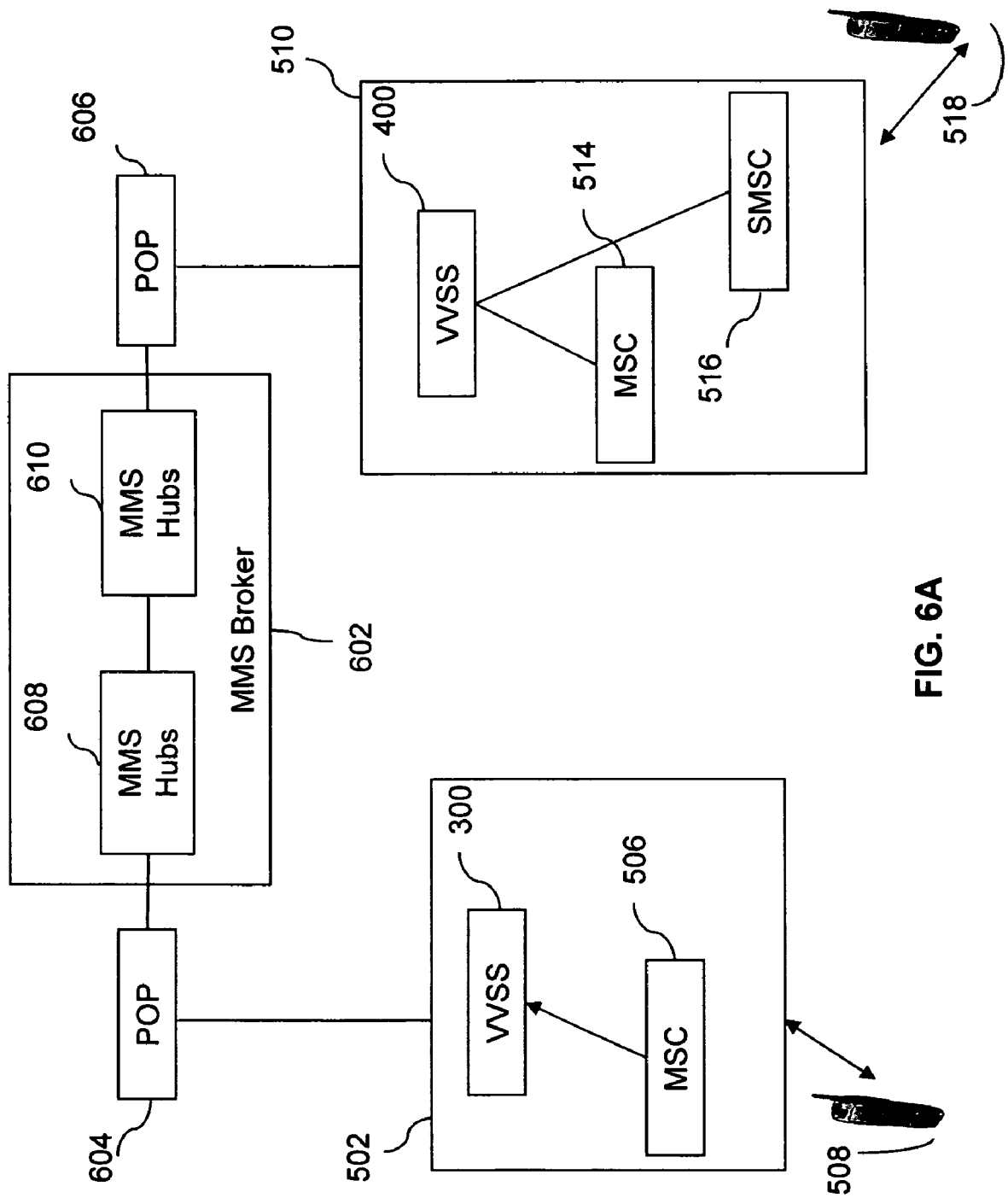
FIG. 6A depicts an embodiment relating to interworking between the sender VVSS and the recipient VVSS via at least one MMS broker.

FIG. 6A depicts an embodiment dealing with interworking between the sender VVSS 300 and the recipient VVSS 400 via at least one MMS broker 602. The sender VVSS operator 502, located in a first region, interworks with the recipient VVSS operator 510 in a second region via the MMS broker 602. In one embodiment, the region may be defined as a country, for example. The sender VVSS operator 502 communicates with the MMS broker 602 through a first access point 604, such as a POP. The POP is an access point used, for example, for secure communication over an IP network. A protocol, namely, MM4, may be used on top of the IP network for secure communication. The recipient VVSS operator 510 communicates with the MMS broker 602 through a second access point 606, such as a second POP. The MMS-broker 602 comprises at least one MMS hub in this example. In an embodiment of the present invention, the MMS broker 602 comprises a first MMS hub 608 and a second MMS hub 610.

The message sender 508 calls the sender VVSS operator 502 to send a multimedia message intended for the message recipient 518. The MSC 506 establishes a connection between the message sender 508 and the sender VVSS 300. The message sender 508 leaves the multimedia message at the sender VVSS 300. In one embodiment of the present invention, the sender VVSS may identify the recipient VVSS operator 400, similarly to as described in conjunction with FIG. 3. Otherwise, the sender VVSS 300 sends the multimedia message to the first MMS hub 608 through the access point 604. In one embodiment, the first MMS hub 608 routes the multimedia message to the second MMS hub 610 in case the message does not contain routing information of the recipient VVSS. The MMS broker 602 identifies the recipient VVSS address using its routing logic and based upon the message recipient number provided by the sender VVSS 300.

Thereafter, the MMS broker 602 delivers the multimedia message to the recipient VVSS 400. The recipient VVSS 400 stores the multimedia message and generates a notification alert to be sent to the message recipient 518. The notification alert comprises a call-back-number for the message recipient 518. The call-back number can be a prefixed sender number of the message, where the prefix is defined by the recipient VVSS 400. The recipient VVSS 400 directs the SMSC 516 to send the notification alert to the message recipient 518, and the SMSC 514 then sends the notification alert to the message recipient 518. The message recipient 518 may call back at the number provided in the notification alert to retrieve the multimedia message.

Figure 6B:
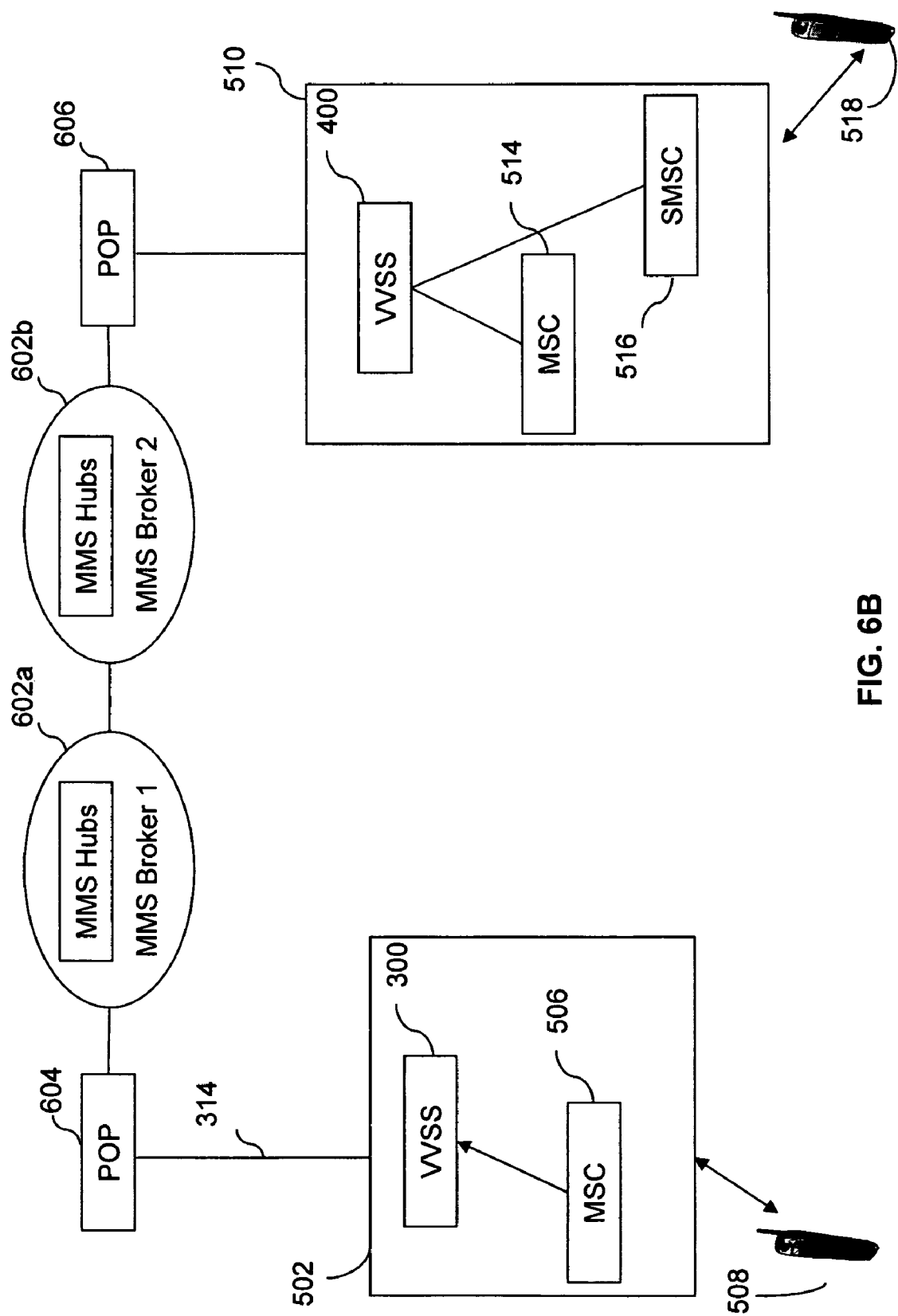
FIG. 6B depicts another embodiment relating to interworking between the sender VVSS and the recipient VVSS via a first MMS broker and a second MMS broker.

FIG. 6B depicts another embodiment dealing with interworking between the sender VVSS 300 and the recipient VVSS 400 via a first MMS broker 602a and a second MMS broker 602b. The first MMS broker 602a comprises at least one MMS hub. The second MMS broker 602b comprises at least one MMS hub. The sender VVSS 300 communicates with first MMS broker 602a via the access point 604. The recipient VVSS 400 communicates with the second MMS broker 602b via the access point 606. In one embodiment, the sender VVSS operator 502 located in a first region interworks with the recipient VVSS operator 510 in a second region via the MMS brokers 602a and 602b. In one embodiment, the region may be defined as a country.

The multimedia message is routed to the message recipient 518 similarly to as described in conjunction with FIG. 6A, except that, in FIG. 6B, the first MMS broker 602a peers with the second MMS broker 602b to enable routing of the multimedia message to the message recipient 518.

Figure 6C:
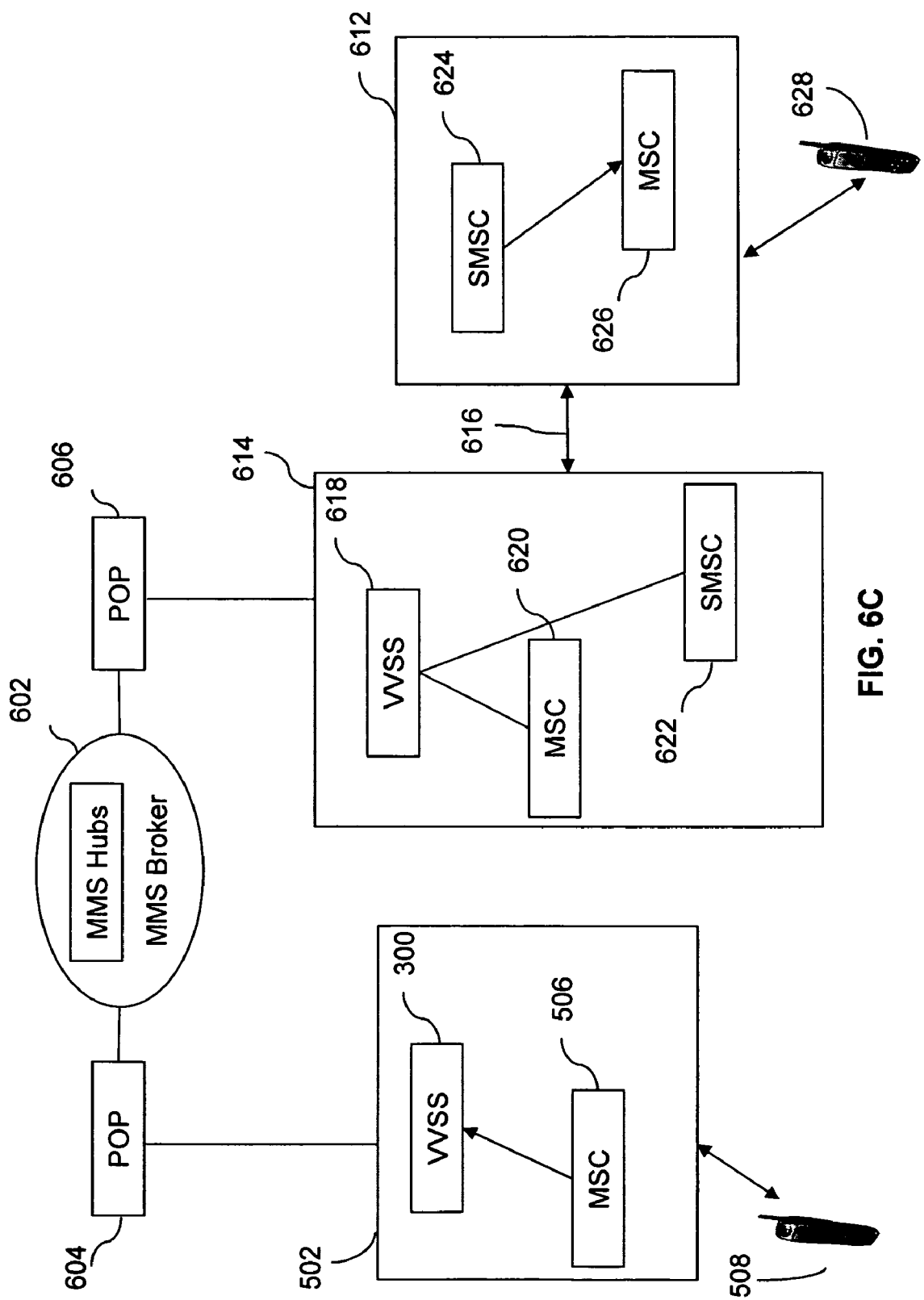
FIG. 6C depicts an embodiment relating to interworking between the sender VVSS operator and a non-VVSS recipient operator via a third party VVSS operator.

FIG. 6C depicts an embodiment dealing with interworking between the sender VVSS operator 502 and a non-VVSS recipient operator 612 via a third-party VVSS operator 614. The non-VVSS recipient operator 612 communicates with the third-party VVSS operator 614 via a link 616 that uses, for example, one of IP, SS7 protocol, and voice trunk and signaling. In one embodiment, the non-VVSS recipient operator 612 may enter into an agreement with the third-party VVSS operator 614. The sender VVSS operator 502 interworks with the third-party VVSS operator 614 via the MMS broker 602 using MM4 protocol. In one embodiment, the sender VVSS operator 502, located in a first region, interworks with the non-VVSS recipient operator 612 via the third-party VVSS operator 614, located in a second region. The non-VVSS recipient The provider for the services hub 102 can be a MMS broker or multiple MMS brokers peering with each other. Alternatively, the services hub 102 provider can be a GRX operator or multiple peering GRX operators. Alternatively, the services hub 102 can be an integrated part of the sender VVSS 300, and the sender VVSS 300 may communicate with the recipient VVSS 400 using a MM4 protocol.

Figure 5B:
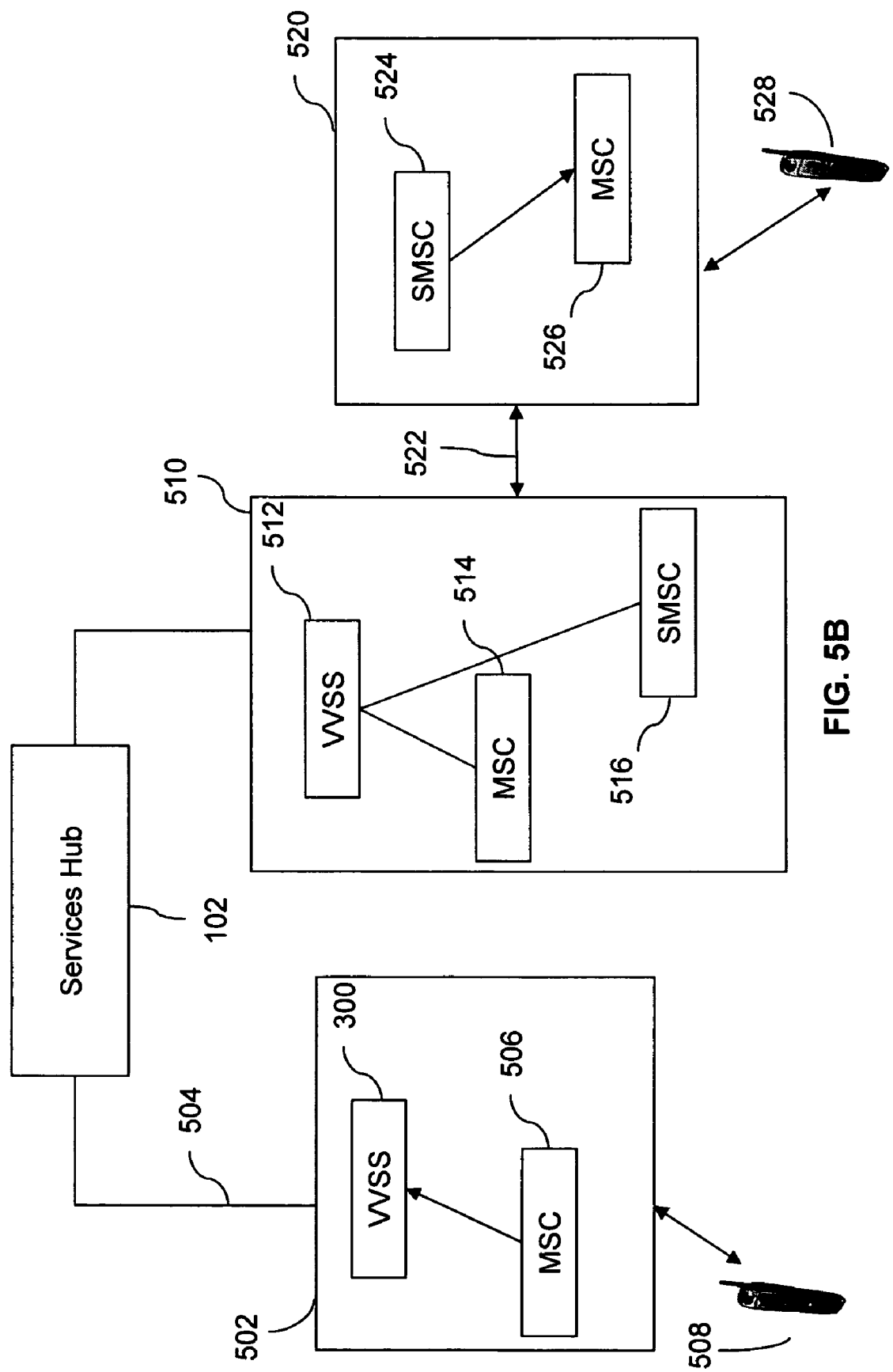
FIG. 5B illustrates another embodiment relating to interworking between the sender VVSS and a non-VVSS recipient operator via a services hub and a third-party VVSS operator.

FIG. 5B illustrates another embodiment dealing with interworking between the sender VVSS 300 and a non-VVSS recipient operator 520 via services hub 102 and a third-party VVSS operator 510. In one embodiment, the sender VVSS operator 502 and the non-VVSS recipient operator 520 may be located in different regions, such as different countries. However, the non-VVSS recipient operator 520 and the third-party VVSS operator 510 may also be co-regionally located.

A sender VVSS operator 502 hosts the sender VVSS 300 that communicates with the service hub 102 over a first link 504, via, for example, a MM4 protocol, and a MSC 506. In one embodiment of the present invention, the sender VVSS 300 communicates with the MSC 506 over one of PIP, SS7 protocol, or voice trunk. Further, the sender VVSS operator 502 services a message sender 508. A third-party VVSS operator 510 hosts a VVSS 512 that communicates with the service hub 102, via, for example, MM4 protocol. The third-party VVSS operator 510 comprises a MSC 514, and an SMSC 516. In one embodiment of the present invention, the third-party VVSS 512 communicates with the MSC 514 over one of IP, SS7 protocol, or voice trunk. In one embodiment, the third-party VVSS 512 communicates with the SMSC 516 using one of IP, SS7 protocol, or voice trunk. The third-party VVSS operator 510 communicates with a non-VVSS recipient operator 520 over a third link 522. In one embodiment of the present invention, the third link 522 is one of IP, SS7 protocol, or voice trunk. The non-VVSS recipient operator 520 comprises an SMSC 524 and a MSC 526, for example. In one embodiment, the SMSC 524 communicates with the MSC 526 over SS7 protocol. Further, the non-VVSS recipient operator 520 services a message recipient 528, in this example.

The sender VVSS 300 delivers the multimedia message to the third-party VVSS 512 using the services hub 102. The third-party VVSS 512 stores the multimedia message and operator 612 and the third-party VVSS operator 614 may be co-regionally located, such as in the same country.

The third-party VVSS operator 614 comprises a VVSS 618, a MSC 620, and an SMSC 622. The non-VVSS recipient operator 612 comprises an SMSC 624 and a MSC 626. The non-VVSS recipient operator 612 services a message recipient 628.

The message sender 508 calls the sender VVSS operator 502 to send a multimedia message intended for the message recipient 628. The MSC 506 establishes a connection between the message sender 508 and the sender VVSS 300, and the message sender 508 then leaves the multimedia message at the sender VVSS 300. The sender VVSS 300 routes the multimedia message to the third-party VVSS operator 614 using the MMS broker 602, similarly to as described in conjunction with FIG. 6A.

The VVSS 618 of the third-party VVSS operator 614 stores the multimedia message and generates a notification alert to be sent to the non-VVSS recipient operator 612. The notification alert comprises a call-back number for the message recipient 628, for example. The call-back number is a number from the second retrieval number storage of the third-party VVSS 618 that is allocated for the multimedia message of the non-VVSS recipient. The VVSS 618 directs the SMSC 622 to send the notification alert to the SMSC 624. The SMSC 624 sends the notification alert to the message recipient 628. The message recipient 628 may call back on the number provided in the notification alert to retrieve the multimedia message.

Figure 7:
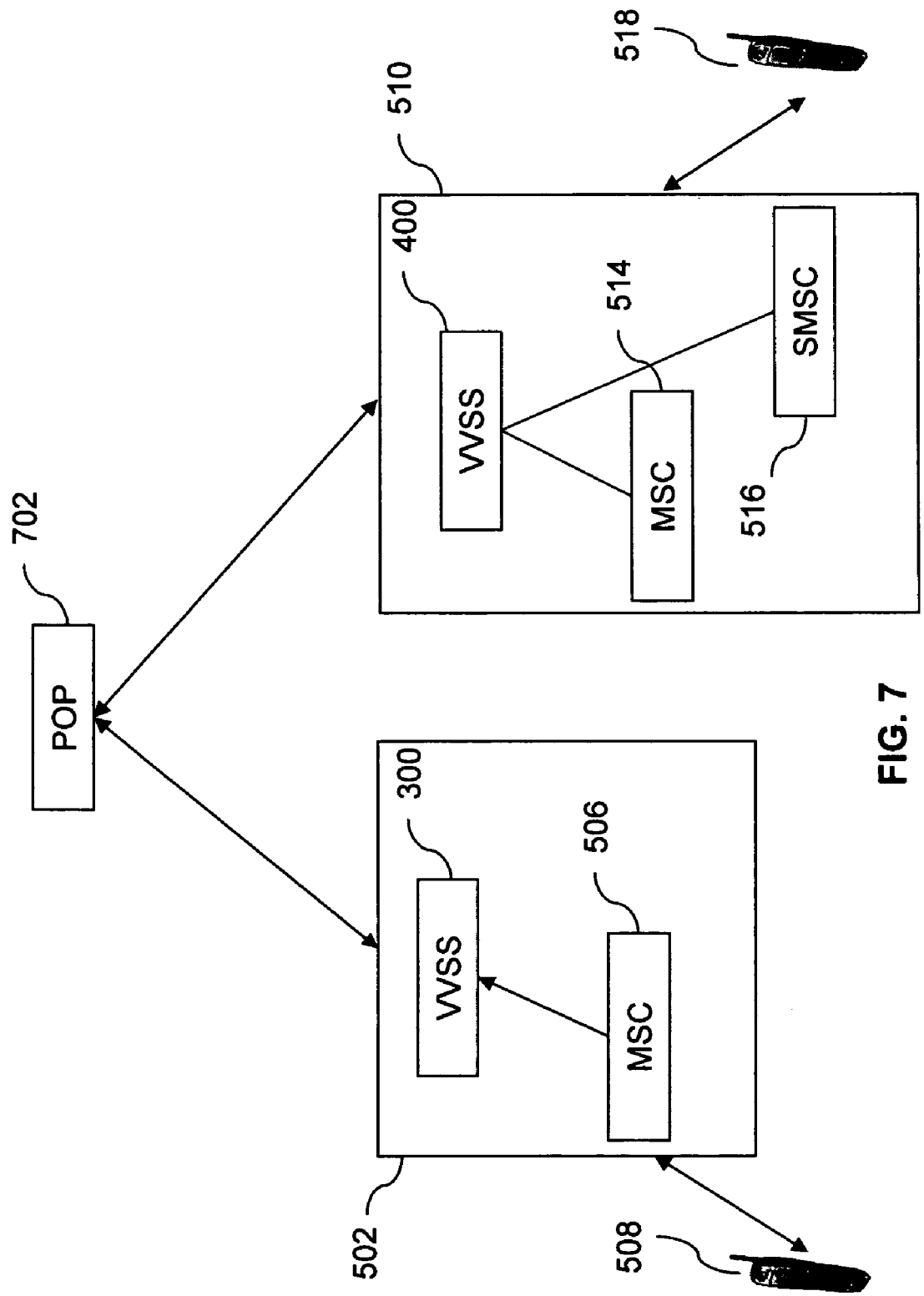
FIG. 7 depicts an embodiment relating to interworking between the sender VVSS and the recipient VVSS via point of presence (POP)

FIG. 7 depicts an embodiment dealing with interworking between the sender VVSS 300 and the recipient VVSS 400 via a POP 702. The sender VVSS 300 and the recipient VVSS 400 communicate via the POP 702 using a protocol, such as a MM4 protocol. In one embodiment, the sender VYSS operator 502 is located in a first region, while the recipient VVSS operator 510 is located in a second region. In one embodiment, the region may be defined as a country.

The message sender 508 calls the sender VVSS operator 502 to send a multimedia message intended for the message recipient 518. The MSC 506 establishes a connection between the message sender 508 and the sender VVSS 300, and the message sender 508 then leaves the multimedia message at the sender VVSS 300. The sender VVSS 300 identifies the recipient VVSS operator, similarly to as described in conjunction with FIG. 3. Thereafter, the sender VVSS 300 sends the multimedia message to the POP 702, which forwards the multimedia message to the recipient VVSS 400.

The recipient VVSS 400 stores the received multimedia message and generates a notification alert to be sent to the message recipient 518. The notification alert comprises a call-back number for the message recipient 518, for example. The call-back number may be a prefixed sender number, where the prefix is defined by the recipient VVSS 400. The recipient VVSS 400 directs the SMSC 516 to send the notification alert to the message recipient 518, and the SMSC 516 then sends the notification alert to the message recipient 518. The message recipient 518 may call back on the number provided in the notification alert to retrieve the multimedia message, for example.

Figure 8:
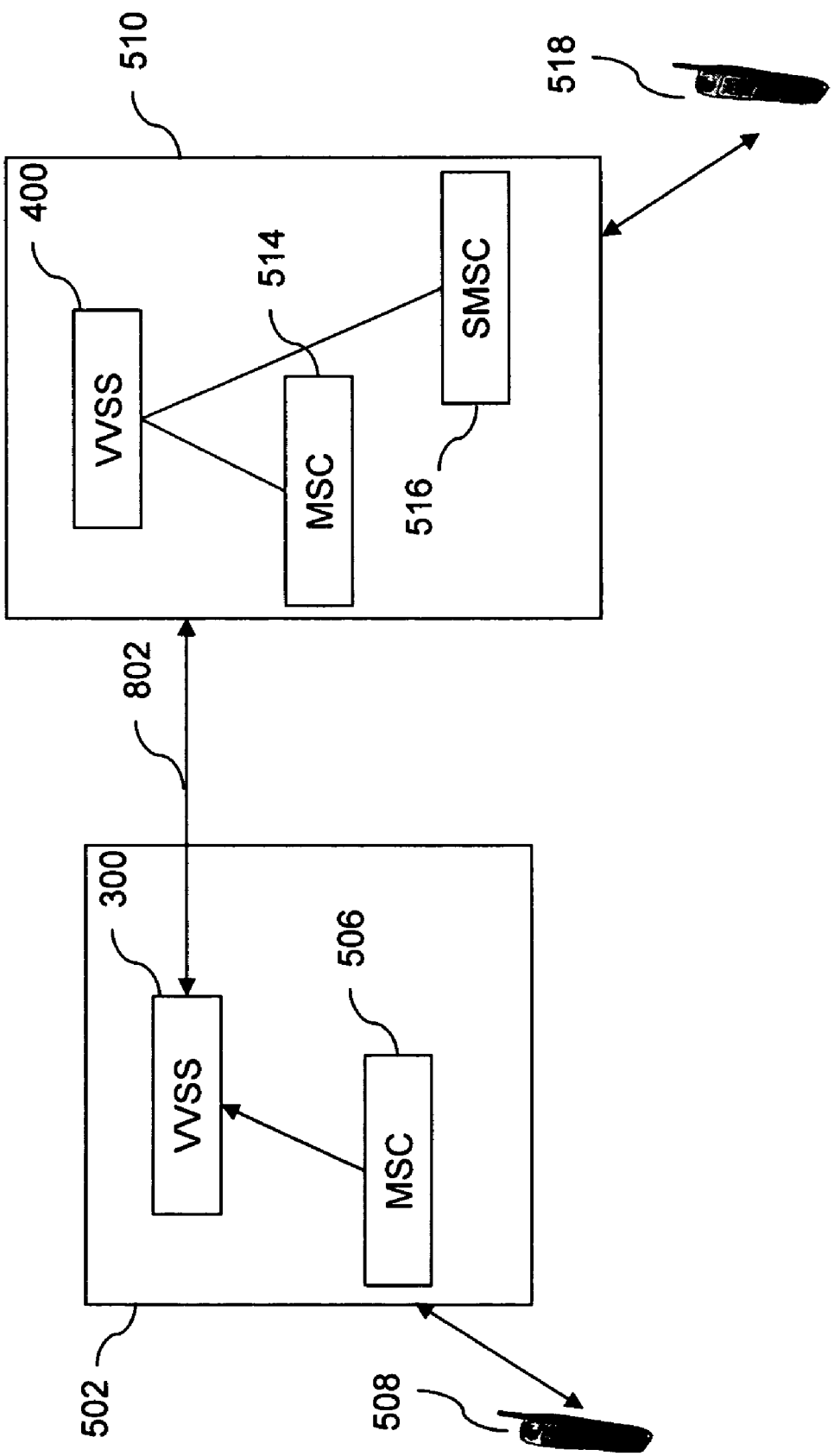
FIG. 8 depicts an embodiment relating to interworking between the sender VVSS and the recipient VVSS using a link.

FIG. 8 depicts an embodiment dealing with interworking between the sender VVSS 300 and the recipient VVSS 400 using a link 802. The sender VVSS 300 and the recipient VVSS 400 communicate with each other using a protocol, such as a MM4 protocol, over the link 802. In one embodiment, the sender VVSS operator 502 is located in a first region, while the recipient VVSS operator 510 is located in a second region. In one embodiment, the region may be defined as a country.

In an embodiment of the present invention, the message sender 508 calls the sender VVSS operator 502 to send a multimedia message intended for the message recipient 518. The MSC 506 establishes a connection between the message sender 508 and the sender VVSS 300, and the message sender 508 then leaves the multimedia message at the sender VVSS 300. The sender VVSS 300 identifies the recipient VVSS operator, similarly as described in conjunction with FIG. 3. Thereafter, the sender VVSS 300 sends the multimedia message to the recipient VVSS 400 using the link 802.

The recipient VVSS 400 stores the received multimedia message and generates a notification alert to be sent to the message recipient 518. The notification alert comprises a call-back number for the message recipient 518, for example. The call-back number may be a prefixed sender number where the prefix is defined by the recipient VVSS 400. The recipient VVSS 400 directs SMSC 516 to send the notification alert to the message recipient 518, and the SMSC 516 then sends the notification alert to the message recipient 518. The message recipient 518 may call back at the number provided in the notification alert to retrieve the multimedia message, for example.

Figure 9:
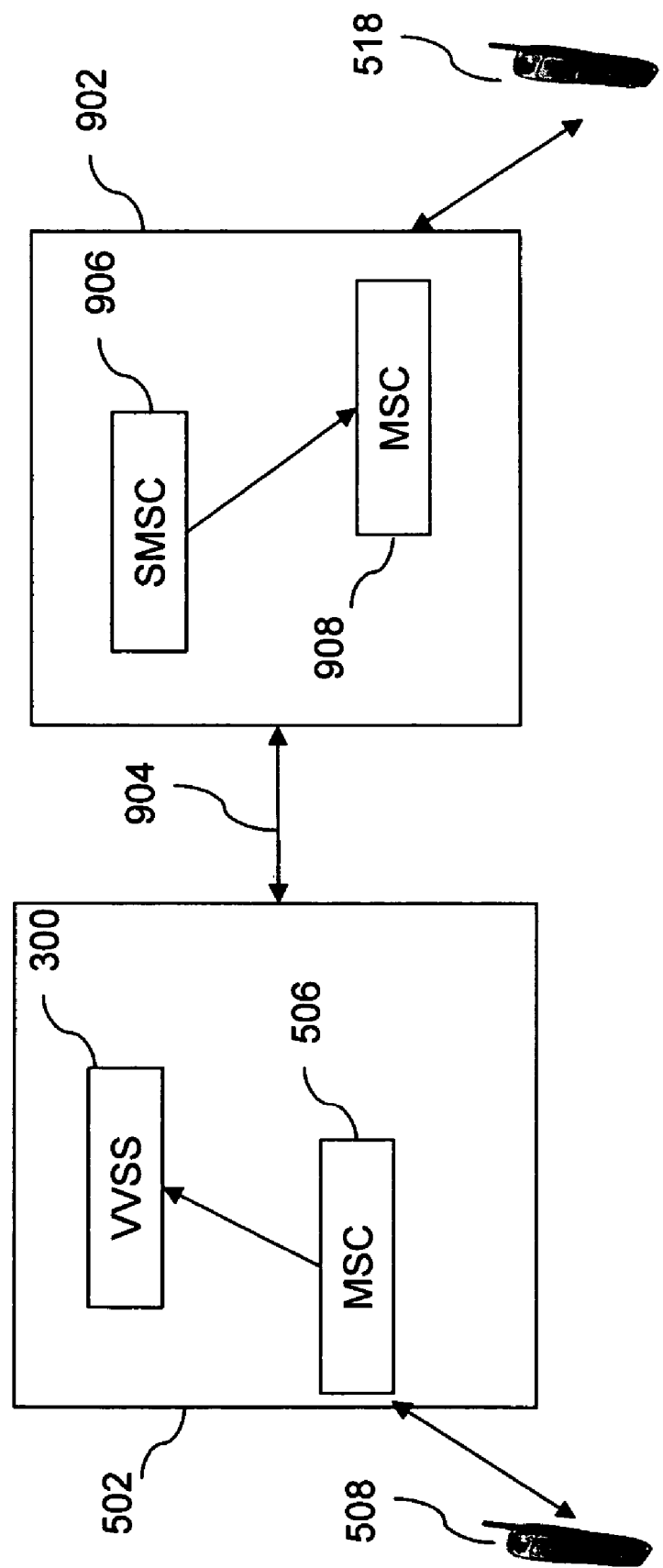
FIG. 9 illustrates an embodiment relating to interworking between the sender VVSS operator and a non-VVSS recipient operator using a link.

FIG. 9 illustrates an embodiment relating to interworking between the sender VVSS operator 502 and a non-VVSS recipient operator 902 using a link 904. The link 904 may be, without limitation, one of IP, SS7 protocol. Alternatively, the link 904 may be voice trunk and signaling. The non-VVSS recipient operator 902 comprises an SMSC 906 and a MSC 908. In one embodiment, SMSC 906 communicates with the MSC 908 over SS7 protocol. The non-VVSS recipient operator 902 services a message recipient 518.

The message sender 508 calls the sender VVSS operator 502 to send a multimedia message intended for the message recipient 518. The MSC 506 establishes a connection between the message sender 508 and the sender VVSS 300, and the message sender 508 then leaves the multimedia message at the sender VVSS 300. The sender VVSS 300 identifies the non-VVSS recipient operator 902, similarly as described in conjunction with FIG. 3. Further, the sender VVSS 300 generates a notification alert to be sent to the message recipient 518. The notification alert comprises a call-back number for the message recipient 518, for example. The call-back number may be a number, from the first retrieval number storage 310 of the sender VVSS 300, which, for example, may be allocated for the multimedia messages of the non-VVSS recipient. The non-VVSS recipient operator 902 directs SMSC 906 to send the notification alert to the message recipient 518, and the SMSC 906 then sends the notification alert to the message recipient 518. The message recipient 518 may call back on the number provided in the notification alert to retrieve the multimedia message, for example.

In one embodiment, the sender VVSS 300 can also use a MM7 interface to a MMSC to piggyback on the existing MMS infrastructure for the VVSS delivery without any changes to the existing MMS infrastructures. However, the VVSS message will be delivered as a MMS message to the message recipient. As a result, the multimedia message might not be delivered to the message recipient handset either because the handset might not support MMS or the subscriber may not have subscribed to a data or a MMS plan, for example. Upon failure of MMS delivery, the sender VVSS may resort to the MM4 interface to deliver the multimedia message via the services hub.

FIGS. 5-9 illustrate interworking in accordance with various embodiments of the present invention wherein the message sender and the message recipient are present in their operator networks. However, the present invention also enables a multimedia message to be delivered between the message sender and the message recipient when either one or both are roaming.

In an embodiment, if the recipient is roaming in a visiting operator network, either the sender VVSS or the services hub may have a SS7 connection with the home location register (HLR) of the recipient operator. Alternatively, either the sender VVSS or the services hub may have an IP connection to query the recipient operator, which, in turn, may query the HLR. In the case of a direct SS7 connection to the HLR, the sender VVSS or the services hub may send MAP SR1-SM to determine the MSC of the recipient, which may have set the option to inform the sender that he is roaming, for example. For the IP connection, specific protocols may be defined to facilitate communication between the sender VVSS or the services hub and the MSC of the recipient.

Further, the roaming recipient may retrieve or respond to the notification alert if the visiting operator network has customized applications for mobile networks enhanced logic (CAMEL) Roaming Agreements with the recipient HPMN network. For the visiting operator network being a non-CAMEL operator network not on the ecosystem, the visiting operator network may provide a dial out option to play the multimedia message as if the subscriber is on a fixed-line or non-ecosystem member network. In one embodiment, if the dial out fails, the visiting operator network may define a configurable number and interval for redialing. In case the dial fails, a notification alert may be sent to the message recipient either as a missed call alert ("A has called you but missed, please call back") or with a call-back number (generic one) with a pin (as a password) for the message recipient to call back. In another embodiment, the dial out option may be omitted, and only the notification alert may be sent. In one embodiment, the multimedia message can also contain an unstructured supplementary services data (USSD) dial string that includes the message number in the format "*<home-USSD-shortcode>*<messagenumber>#". The USSD call back has the advantage that the caller ID is guaranteed since it is a call back. The VVSS may register as a USSD application, which interfaces with the HPMN HLR via a USSD gateway.

Figure 10:
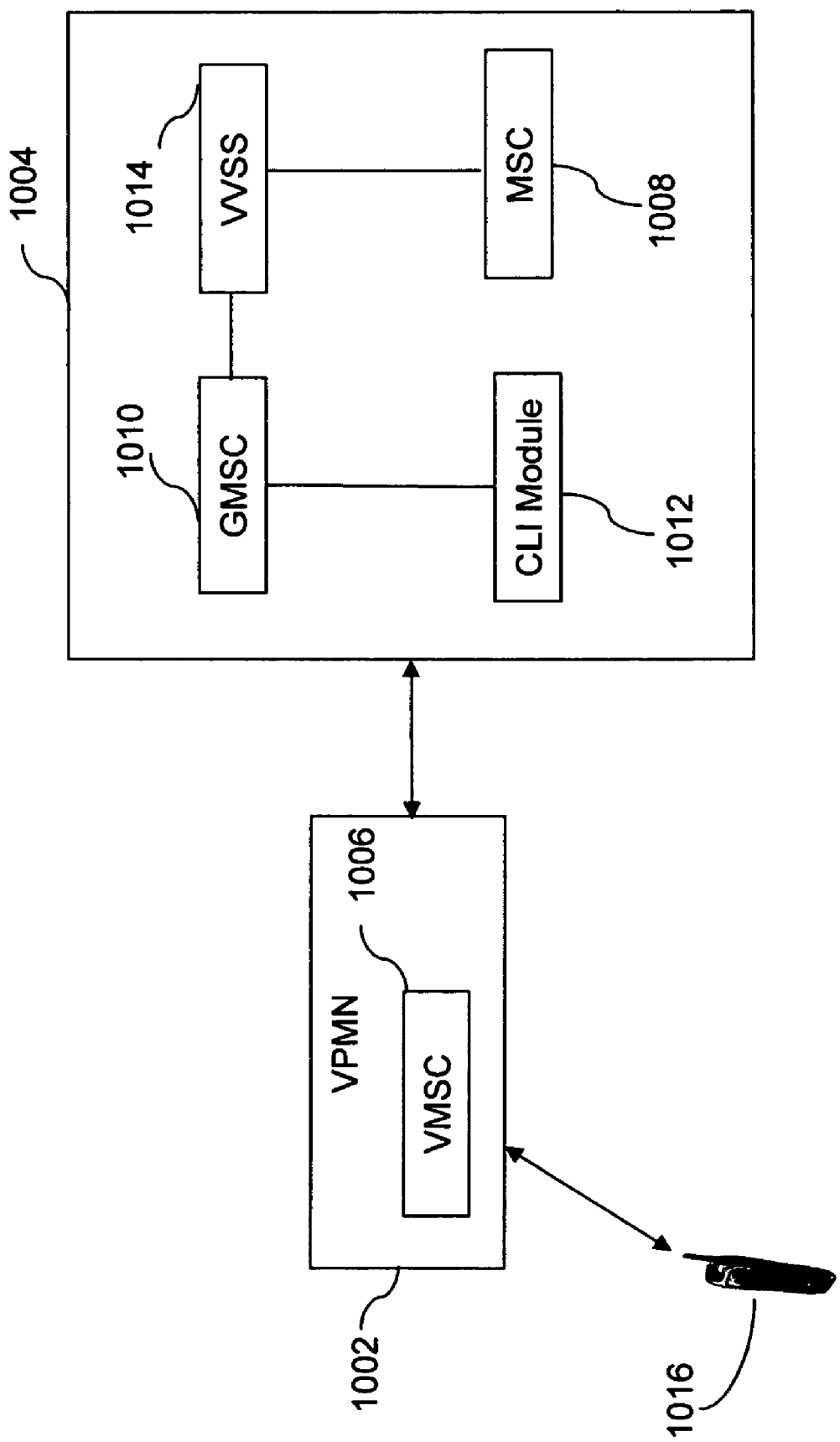
FIG. 10 illustrates an embodiment relating to when a message sender is roaming in a visiting operator network.

FIG. 10 illustrates an embodiment when the message sender is roaming in a visiting operator network. In one embodiment, the sender operator supports the VVSS service for roamers in networks that have Camel Roaming Agreements with the HPMN network or with the operator of central hosting VVSS. In this case, the roamer may send, retrieve, and reply to a VVSS message. FIG. 10 illustrates a VPMN 1002 coupled to a HPMN 1004. The VPMN 1002 is the visiting operator network in which the sender is roaming. The HPMN 1004 is the home network of the sender. The VPMN 1002 comprises a VMSC 1006, while the HPMN 1004 comprises a MSC 1008, a GMSC 1010, a calling line identification (CLI) module 1012, and a VVSS 1014.

The roamer 1016 communicates with the VMSC 1006 of the VPMN 1002. The VMSC 1006 of the VPMN 1002 communicates with the CLI module 1012 using originating CAMEL subscription information (O-CSI). The VMSC 1006 of the VPMN 1002 may communicate with the CLI module 1012 via a command, such as CAP Initial DP (A, B). The O-CSI can be dynamically created by a third-party system or predefined by the HPMN 1004, for example. The CLI module 1012 allocates a temporary routing number called dialed number identification service (DN1S) and stores a relationship between DN1S and the information parameters—for example A, B and the like—obtained from the CAP Initial DP. The CLI module 1012 may issue CAP Connect (DN1S) to the VMSC 1006, which routes the call to the GMSC 1010 using the DN1S. The GMSC 1010 may issue one of an intelligent network (IN), an integrated service digital network user part (ISUP), or a CAP 3 command to the CLI module 1012 based on the DN1S. The CLI module 1012 may issue IN Connect (A, B) to the GMSC 1010 using the relationship between the information parameters obtained from the Initial DP and the DN1S, for example. Thereafter, the GMSC 1010 connects the roamer 1016 to the VVSS 1014, and the roamer may then send or retrieve a VVSS message. It may be noted that the roamer 1016 needs to dial the prefixed B-party number only. This method thus provides an alternative approach to the USSD call back solution, which involves the user dialing service key followed by the prefixed B-party number—a different user experience from that typically encountered at home.

Other Variations

Provided above for the edification of those of ordinary skill in the art, and not as a limitation on the scope of the present invention, are detailed illustrations of a scheme for forwarding at least one multimedia message between a sender and a recipient via a session-based multimedia messaging system and interworking between at least two operators or an operator and a hub. Numerous variations and modifications within the spirit of the present invention will of course occur to those of ordinary skill in the art, in view of the embodiments that have now been disclosed. For example, while in the described embodiments the present invention is implemented primarily from the point of view of common-carrier networks of voice telecommunications by mobile means, the present invention may also be effectively implemented on a handset of a fixed line telephone (e.g., VoIP; PC desktop client).

The interworking multimedia messaging service is radio technology independent and works with 2G (global system for mobile communications (GSM) or code division multiple access (CDMA) or personal digital cellular (PDC) or other) or 3G (third generation partnership project (3GPP), third generation partnership project 2 (3GPP2), IMS, etc.) technology. Further, various embodiments are completely handset independent from a sender's (including reply) perspective, since they only require a telephone call to a backend interactive voice response (IVR) system. The handset can therefore be a fixed line telephone (including VoIP, PC desktop client, etc.) or mobile telephone (including all IP, SIP, IMS, etc.). However, the SMS alert mechanism in some embodiments described above requires the recipient device of the multimedia message to support multimedia message which is a basic functionality of mobile telephones.

The examples under the present invention detailed in the illustrative examples contained herein are described using terms and constructs drawn largely from GSM mobile telephony infrastructure. But use of these examples should not be interpreted to limit the present invention to those media. The present invention can be of use and provided through any appropriate type of telecommunications medium, including, without limitation: (i) any mobile telephony network including without limitation GSM, third generation GSM (3GSM), third generation (3G), personal communication services (PCS), time division multiple access (TDMA), CDMA or CDMA 2000, satellite telephones or other mobile telephone networks or systems; (ii) any so-called wireless fidelity (WiFi) apparatus normally used in a home or subscribed network, but also configured for use on a visited or non-home or non-accustomed network, including apparatus not dedicated to telecommunications, such as PCs or Palm-type or Windows Mobile devices; (iii) an entertainment console platform, such as Sony Playstation, play station portable (PSP), or other apparatus that are capable of sending and receiving telecommunications over home or non-home networks; or (iv) fixed-line devices made for receiving communications, but capable of deployment in numerous locations while preserving a persistent subscriber ID, such as the eye2eye devices from Dlink, or telecommunications equipment meant for VoIP communications, such as those provided by Vonage or Packet8.

| Abbreviations | |
|---|---|
| 3GPP | 3$^{rd}$ Generation Partnership Project |
| 3GPP2 | 3$^{rd}$ Generation Partnership Project 2 |
| CAMEL | Customized Applications for Mobile networks Enhanced Logic |
| CAP/IN | CAMEL Application Part/Intelligent Network |
| CDMA | Code Division Multiple Access |
| CLI | Calling Line Identification |
| CC | Country Code |
| DNIS | Dialed Number Identification Service |
| GMSC | Gateway Mobile Switching Center |
| GRX | GPRS Roaming Exchange |
| GSM | Global System for Mobile communication |
| HPMN | Home Public Mobile Network |
| HLR | Home Location Register |
| IN | Intelligent Network |
| IMSI | International Mobile Subscriber Identity |
| IP | Internet Protocol |
| IMS | IP Multimedia Subsystems |
| IMS/SIP | IP Multimedia Subsystems/Session Initiation Protocol |
| IMSI | International Mobile Subscriber Identity |
| ISUP | Integrated Services Digital Network User Part |
| IVR | Interactive Voice Response |
| MAP SRI-SM | Mobile Application Part Send Routing Information for SMSShort Message |
| MCC | Mobile Country Code |
| MNC | Mobile Network Code |
| MMS | Multimedia Messaging Service |
| MMSC | Multimedia Messaging Service Center |
| MIME | Multi-purpose Internet Mail Extensions |
| MSC | Mobile Switching Center |
| NDC | Network Destination Code |
| O-CSI | Originating CAMEL Subscription Information |
| PC | Personal Computer |
| PCS | Personal Communication Services |
| PDC | Personal Digital Cellular |
| POP | Point of Presence |
| PSP | Play Station Portable |
| SIP | Session Initiation Protocol |
| SMS | Short Messaging Service |
| SMSC | Short Messaging Service Controller |
| SS7 | Signaling System #7 |
| TDM | Time Division Multiplexing |
| TDMA | Time Division Multiplexing Address |
| USSD | Unstructured Supplementary Service Data |
| VMSC | Visiting Mobile Switching Center |
| VPMN | Visited Public Mobile Network |
| VoIP | Voice over Internet Protocol |
| VVSS | Voice/Video SMS System |
| WiFi | Wireless Fidelity |

TECHNICAL REFERENCES

Each of Which is Incorporated by Reference Herein in its Entirety

GSM 378 on CAMEL
Digital cellular telecommunications system (Phase 2+); Customised Applications for Mobile network Enhanced Logic (CAMEL) Phase 2;
Stage 2
(GSM 03.78 version 6.7.0 Release 1997)
GSM 978 on CAMEL Application protocol
Digital cellular telecommunications system (Phase 2+); Customised Applications for Mobile network Enhanced Logic (CAMEL);
CAMEL Application Part (CAP) specification
(GSM 09.78 version 7.1.0 Release 1998)
Q761-Q730 on ISUP Signaling, Function and Procedure
Q.761 (Functional description of the ISDN User Part of CCITT Signaling System No. 7)
Q.762 (General functions of CCITT Signaling System No. 7 ISDN User Part Messages and parameters)
Q.763 (Formats and codes of CCITT Signaling System No. 7 ISDN User Part Messages and parameters)
Q.764 (1999), Signaling System No. 7—ISDN User Part signaling procedures
Q.763 (1999), Signaling System No. 7—ISDN User Part formats and codes
Q.730 (1999), ISDN User Part supplementary services
Q.711 (1996), Functional description of signaling connection control part
Q.712 (1996), Definition and function of signaling connection control part messages
Q.713 (1996), Signaling connection control part formats and codes
Q.714 (1996), Signaling connection control part procedures
Q.716 (1993), Signaling Connection Control Part (SCCP) performance
GSM 340 on SMS
Digital cellular telecommunications system (Phase 2+); Technical realization of the Short Message Service (SMS);
(GSM 03.40 version 7.4.0 Release 1998)
SMPP Forum: SMPP Protocol Document Version: 12-Oct.-1999 Issue 1.2
Universal Mobile Telecommunications System (UMTS); Multimedia Messaging Service (MMS), Functional description;
Stage 2
(3GPP TS 23.140 version 4.2.0 Release 4)
GSM 902 on MAP specification
Digital cellular telecommunications system (Phase 2+); Mobile Application Part (MAP) Specification
(3GPP TS 09.02 version 7.9.0 Release 1998)
GSM 340 on SMS
Digital cellular telecommunications system (Phase 2+); Technical realization of the Short Message Service (SMS);
(GSM 03.40 version 7.4.0 Release 1998)
GSM 378 on CAMEL
Digital cellular telecommunications system (Phase 2+); Customised Applications for Mobile network Enhanced Logic (CAMEL) Phase 2;

Stage 2
(GSM 03.78 version 6.7.0 Release 1997)
GSM 978 on CAMEL Application protocol
Digital cellular telecommunications system (Phase 2+);
Customised Applications for Mobile network Enhanced Logic (CAMEL);
CAMEL Application Part (CAP) specification
(GSM 09.78 version 7.1.0 Release 1998)
Technical Specification
3rd Generation Partnership Project;
Technical Specification Group Services and System Aspects;
Service accessibility
(Release 1999)
Signalling procedures and the Mobile Application Part (MAP)
(Release 1999)
Q1214-Q1218 on Intelligent Networks
IMS architectures, 3GPP, and 3GPP2

What is claimed is:

1. A multimedia message interworking system for delivering multimedia messages, the system including at least one sender in a voice/video short messaging service system (VVSS) in communication with message recipients, the sender VVSS comprising:
a first multimedia message storage to store one or more first multimedia messages for a first message recipient and one or more second multimedia messages for a second message recipient;
a sender routing table to store routing information of at least one recipient operator; and
a sender routing logic component for deciding a mode of interworking for routing the one or more first multimedia messages to the first message recipient and the one or more second multimedia messages to the second message recipient based upon the routing information;
wherein the first message recipient calls a common multimedia message retrieval number to directly access one of the one or more first multimedia messages stored in the first multimedia message storage and calls a second common multimedia message retrieval number to directly access a different one of the one or more first multimedia messages stored in the first multimedia message storage;
wherein the second multimedia message recipient calls the common multimedia message retrieval number to directly access a second multimedia message stored in the first multimedia message storage;
wherein the accessed one of the one or more first multimedia messages is identified based on the common multimedia message retrieval number and an identification of the first message recipient and the accessed different one of the one or more first multimedia messages is identified based on the second common multimedia message retrieval number and the identification of the first message recipient; and
wherein the second multimedia message is identified based on the common multimedia message retrieval number and an identification of the second message recipient.

2. The system of claim 1, wherein the sender VVSS is coupled with a media gateway via one of a circuit-switched connection or a packet-switched connection.

3. The system of claim 1, wherein the sender VVSS further comprises:
a recipient identification decoding module to decode the recipient operator network identification on receipt of the message recipient number.

4. The system of claim 1, wherein the sender VVSS further comprises:
a first retrieval number storage to store a set of multimedia message retrieval numbers.

5. The system of claim 1, wherein the multimedia message has at least one multimedia retrieval number, and wherein the sender VVSS further comprises:
a sender notification module to generate a notification alert, the notification alert comprising at least one selected from a group consisting of a message type, a message sender's identification, and one of the at least one multimedia message retrieval number.

6. The system of claim 1, wherein the system is interworking via one of a bilateral communication or indirect interworking.

7. The system of claim 6, wherein the bilateral communication is facilitated using one selected from a group consisting of a services hub, a general packet radio service roaming exchange (GRX), and a multimedia messaging service (MMS) broker.

8. The system of claim 6, wherein the bilateral communication is facilitated using one selected from a group consisting of a MM7 protocol, a MM4 protocol, and a signaling system #7 (SS7) protocol.

9. The system of claim 6, wherein the bilateral communication is facilitated using one selected from a group consisting of a circuit-switched network and a packet switched network.

10. The system of claim 6, wherein the indirect interworking comprises communication between the sender VVSS and a non-VVSS recipient operator via a third VVSS operator.

11. The system of claim 10, wherein the sender VVSS is in bilateral communication with the third VVSS operator.

12. The system of claim 10, wherein the non-VVSS recipient operator is in bilateral communication with the third VVSS operator.

13. The system of claim 10, wherein the sender VVSS comprises a services hub.

14. The system of claim 10, wherein the sender VVSS comprises a calling line identification (CLI) module to enable a message sender to send multimedia messages while roaming.

15. The system of claim 1, wherein the at least one recipient operator has a HLR, and wherein the sender VVSS queries the HLR of the at least one recipient operator to determine whether the message recipient is roaming.

16. The system of claim 15, wherein the sender VVSS communicates with the HLR of the at least one recipient operator over one of an SS7 connection or an IP connection.

17. The system of claim 1, wherein the identification of the first and second message recipients occurs via caller ID.

18. A multimedia message interworking system for delivering multimedia messages, the system including a voice/video short messaging service system (VVSS) coupled to a recipient operator network in communication with message recipients, the VVSS comprising:
a multimedia message storage to store one or more first multimedia messages for a first recipient and one or more second multimedia messages for a second recipient;
a multimedia message retrieval number storage to store a set of multimedia message retrieval numbers; and
a recipient notification module to generate a notification alert, the notification alert comprising at least one selected from a group consisting of a message type, a message sender's identification, and one of the multimedia message retrieval numbers;

wherein the first message recipient calls a common one of the multimedia message retrieval numbers to directly access one of the one or more first multimedia messages stored in the multimedia message storage and calls a second common one of the multimedia message retrieval numbers to directly access a different one of the one or more first multimedia messages stored in the first multimedia message storage, wherein the second message recipient calls the common one of the multimedia message retrieval numbers to directly access a second multimedia message stored in the multimedia message storage, wherein the accessed one of the one or more first multimedia messages is identified based on the common multimedia message retrieval number and an identification of the first message recipient and the accessed different one of the one or more first multimedia messages is identified based on the second common one of the multimedia message retrieval numbers and the identification of the first message recipient; and wherein the second multimedia message is identified based on the common multimedia message retrieval number and an identification of the second message recipient.

19. The system of claim 18, wherein the set of multimedia message retrieval numbers comprises one or more selected from a group consisting of a local number of the country of the recipient operator, a voice over Internet protocol (VoIP) number of the VVSS, and a local number mapped to international number of a sender VVSS.

20. The system of claim 18, wherein the identification of the first and second message recipients occurs via caller ID.

21. A multimedia message interworking system for delivering multimedia messages to message recipients, the system comprising:
    a sender in a voice/video short messaging service system (VVSS) in communication with a message sender;
    at least one services hub for receiving one or more first multimedia messages for a first recipient and one or more second multimedia messages for a second recipient from the sender VVSS, the one or more first and second multimedia messages comprising at least a message type and a recipient number from which a recipient operator network can be identified; and
    a services hub routing module residing in the at least one services hub, the services hub routing module identifying a recipient operator based upon the message type and the recipient operator network identification;

wherein the first message recipient calls a common multimedia message retrieval number to directly access one of the one or more first multimedia messages stored in a multimedia message storage and calls a second common multimedia message retrieval number to directly access a different one of the one or more first multimedia messages stored in the first multimedia message storage;

wherein the second message recipient calls the common multimedia message retrieval number to directly access a second multimedia message stored in the multimedia message storage, wherein the accessed one of the one or more first multimedia messages is identified based on the common multimedia message retrieval number and an identification of the first message recipient and the accessed different one of the one or more first multimedia message is identified based on the second common multimedia message retrieval number and the identification of the first message recipient; and wherein the second multimedia message is identified based on the common multimedia message retrieval number and an identification of the second message recipient.

22. The system of claim 21, wherein the services hub further comprises:
    a services hub routing table to identify a next routing hop using at least one of the recipient number and the message type.

23. The system of claim 22, wherein the next routing hop is selected from a group consisting of a third-party VVSS operator, the services hub, and a recipient VVSS operator.

24. The system of claim 22, wherein the multimedia message has a MIME type, and wherein the message type is determined by the MIME type of the multimedia message or a MM4 extensional header.

25. The system of claim 24, wherein the MM4 extensional header indicates the message sender is a sponsor of the multimedia messages.

26. The system of claim 21, wherein each of the first and second multimedia messages comprises a special prefix indicating the message sender is a sponsor of the multimedia messages.

27. The system of claim 21, wherein the services hub comprises one or more of a MMS broker or a GRX provider.

28. The system of claim 21, wherein the sender VVSS communicates with the services hub via a MM4 protocol or a GRX interface.

29. The system of claim 21, wherein the services hub communicates with at least one of a VVSS recipient operator.

30. The system of claim 29, wherein the services hub communicates the VVSS recipient operator via one of a MM4 protocol or a GRX interface.

31. The system of claim 21, wherein, the message type comprises a VVSS message type and a non-VVSS message type.

32. The system of claim 21, wherein, the notification alert comprises identification details of the message type.

33. The system of claim 21, wherein, the recipient operator network identification comprises at least one of an International Mobile Subscriber Identity (IMSI), or an Internet protocol (IP) address of the recipient operator network.

34. The system of claim 21, wherein the identification of the first and second message recipients occurs via caller ID.

* * * * *